United States Patent [19]
Kamiyama et al.

[11] Patent Number: 6,018,914
[45] Date of Patent: *Feb. 1, 2000

[54] LINER FOR MANHOLE AND A METHOD FOR LINING A MANHOLE

[75] Inventors: Takao Kamiyama, Hiratsuka; Yasuhiro Yokoshima, Ibaraki-ken, both of Japan

[73] Assignees: Shonan Gosei-jushi Seisakusho K.K., Kanagawa-ken; Yokoshima & Co., Ibaraki-ken, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/767,622

[22] Filed: Dec. 17, 1996

[30] Foreign Application Priority Data

Mar. 19, 1996 [JP] Japan ................................ 8-062735

[51] Int. Cl.$^7$ ........................................................ E04B 1/64
[52] U.S. Cl. ................................... 52/20; 52/19; 52/182; 52/742.1; 404/25
[58] Field of Search ................................ 52/19, 20, 742.1, 52/182; 404/25

[56] References Cited

U.S. PATENT DOCUMENTS

| | | | |
|---|---|---|---|
| Re. 29,636 | 5/1978 | Gilbu | 52/20 |
| 3,621,623 | 11/1971 | Downes | 52/20 |
| 3,745,738 | 7/1973 | Singer | 52/741.1 |
| 4,038,793 | 8/1977 | Roca | 52/125 |
| 4,089,139 | 5/1978 | Moffa et al. | 52/20 |
| 4,102,088 | 7/1978 | Keller et al. | 52/20 |
| 4,127,990 | 12/1978 | Morrow | 405/36 |
| 4,241,543 | 12/1980 | Foscarini et al. | 52/20 X |
| 4,275,757 | 6/1981 | Singer | 52/20 X |
| 4,581,247 | 4/1986 | Wod | 427/53.1 |
| 5,081,802 | 1/1992 | Westhoff et al. | 52/20 |
| 5,383,311 | 1/1995 | Strickland | 52/20 |
| 5,386,669 | 2/1995 | Almeida | 52/19 |
| 5,405,218 | 4/1995 | Hyde-Smith | 52/20 X |

Primary Examiner—Beth Aubrey
Attorney, Agent, or Firm—Whitham, Curtis & Whitham

[57] ABSTRACT

A flexible tubular manhole liner soaked with a curable liquid resin is inserted into a manhole; this liner is already equipped with a number of bolts or sleeve nuts protruding or exposed from the liner surface, so that it is possible later to attach to the inner wall of the tubular liner a number of ladder steps and a hose for injecting liquid filler to the gap created between the manhole wall and the liner; there is provided a method to line the manhole with such an inventive liner.

15 Claims, 27 Drawing Sheets

LINER FOR MANHOLE AND A METHOD FOR LINING A MANHOLE

BACKGROUND OF THE INVENTION

1. Field of the Invention

The present invention relates to a liner with which the interior of a manhole is lined (hereinafter called "manhole liner") and a method for lining a manhole; and in particular it relates to a manhole liner impregnated with a thermosetting resin and a method for lining a manhole with such a liner.

2. Description of the Prior Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038 (counterpart U.S. Pat. No. 4,581,247).

According to this publication, this method of pipe mending comprises inserting a sufficiently long tubular flexible liner bag into the pipe to be repaired by means of a pressurized fluid, such as air and water. The tubular liner bag is made of a flexible resin-absorbent cloth material impregnated with a thermosetting (heat-curable) liquid resin, and has the outer surface covered with an impermeable plastic film.

More particularly, according to the publication, the tubular flexible liner bag is very long and closed at one end and open at the other. The tubular flexible liner bag is first flattened, then, the open end of it is made to gape wide and hooked (anchored) at one end of the defective or old pipe in a manner such that the wide-opened end of the liner bag completely and fixedly covers and closes the pipe end; a portion of the liner bag is pushed into the pipe whereby an annular pocket is made; then, a pressurized fluid is applied to the pocket portion of the tubular liner bag such that the fluid urges the tubular liner bag to enter the pipe. Since one end of the tubular liner bag is hooked at the end of the pipe, it remains there while the rest of the flexible liner bag proceeds deeper in the pipe as it is turned inside out. (Hereinafter, this manner of insertion shall be called "everting" or "oeversion".) When the entire length of the tubular liner bag is everted (i.e., turned inside out) into the pipe, the everted tubular liner bag is pressed against the inner wall of the pipe by the pressurized fluid or by an inflatable pressure bag (intra-liner bag) later introduced into the pipe, and the tubular flexible liner bag is hardened as the thermosetting liquid resin impregnated through the thickness of the liner bag is heated, which is effected by heating the pressurized fluid filling the tubular liner bag by means of a hot steam, etc. Thereafter, the pressure bag is removed the closed end of the liner bag is cut off. It is thus possible to line the inside wall of the defective or old pipe with a rigid liner without digging the ground and disassembling the pipe sections.

Now, it is also possible to adopt part of this method in a course of lining a manhole.

For instance, as shown in FIG. 33, a sewer pipe 120 is first plugged with a plug 122 at a location upstream to a manhole 121 to be repaired so as to stop the drain water from flowing into the location of lining; then, a tubular manhole liner bag 101 is inserted into the manhole 121 from the ground surface. Here, depending upon the size of the manhole, the insertion of the manhole liner bag 101 can be done by eversion. Thereafter, while the liner bag 101 is pressed against the inner wall of the manhole 121, the thermosetting liquid resin, with which the tissue of the liner bag 101 is soaked, is cured to harden, whereby the inner wall of the manhole 121 is lined with a rigid liner 101. Incidentally, until this lining operation is over, the drain water running in the sewer pipe 120 is drawn out by means of a pump 140 at a location upstream to the plug 122, and the drawn water is transported to some other place, and in most cases back into the pipe 120 at a downstream location.

By the way, as shown in FIG. 33, generally the upper part of a manhole is formed with a reducer portion, where the hole is converged upward such that the manhole is narrowest at its uppermost end.

Now, before lining the manhole 121 with the liner 101, a plurality of ladder steps, not shown, which are rigidly fastened to the inner wall of the manhole 121 in a descendent row, are removed, and when the manhole 121 is newly lined with the liner 101, holes are made at intervals through the rigid liner 101 and partially into the wall of the manhole 121, and, then, a plurality of new ladder steps 147 are hit in these holes and fastened therein, as shown in FIG. 34.

Also, when the liner bag 101 is hardened inside the manhole 121 it becomes very hot and as it cools down its size is reduced so that there is created a gap between the inner wall of the manhole 121 and the liner bag 101. In order to fill up this gap, holes are made through the liner bag 101, and a curable liquid filler is injected through these holes into the gap between the manhole inner wall 121 and the liner bag 101.

Problems the Invention Seeks to Solve

However, if the manhole 121 is very aged, the steps 147 rooted in the wall of the manhole 121 cannot be steadily held and reliably in it, especially when a man steps on them.

Furthermore, the making of the holes for the new ladder steps and those for injection of the liquid filler is done with a drill, and this requires substantial amount of human labor.

SUMMARY OF THE INVENTION

The present invention was made in view of the above problems and others and it is, therefore, an object of the invention to provide a new manhole liner and a method for lining a manhole with such improvements, as the results of which it will become possible to fasten new ladder steps to a manhole wall with high steadiness after the manhole is newly lined, even in cases where the manhole is very aged.

Also, it is another object of the invention to provide a new manhole liner and a method for lining a manhole so that it becomes possible to create the holes for the injection of the liquid filler without difficulty.

Means to Solve the Problems

In order to solve the above problems and others, there is proposed a new tubular liner with which the inner wall of a manhole is lined, comprising a fabric layer soaked with a curable liquid resin, and at least one kind of connector means for making the inner wall of the tubular liner capable of rigidly receiving connective ends.

It is preferable that the tubular liner has a bottom so that the liner is closed and flat at its lower end.

More preferably, the tubular liner further consists of an airtight film layer which covers up the outer wall of the fabric layer.

In a first embodiment later described, the connector means comprises a set of connector assemblies to which ladder steps are connected.

In this first embodiment, it is preferred that each one of the connector assemblies includes bolts, which are supported by the fabric layer and partially extend beyond the inner wall of the fabric layer.

More preferably, each connector assembly consists of first plates which are laid over the outer wall of the fabric layer and with which the heads of the bolts are integrally formed, and second plates which are laid over the inner wall of the fabric layer, with threaded end portions of the bolts penetrating partially beyond the second plates.

In another embodiment, each one of the connector assemblies includes sleeve nuts, which are supported by the fabric layer and the hollow ends of which are exposed from the fabric layer.

In this embodiment, it is preferred that each connector assembly further consists of first plates which are laid over the outer wall of the fabric layer and with which the closed head ends of the sleeve nuts are integrally formed, and second plates which are laid over the inner wall of the fabric layer, the hollow ends of the sleeve nuts penetrating and being flush with the exposed inner faces of the second plates.

In a still another embodiment, the connector means comprises a set of connector assemblies to which liquid filler injection hoses are connected.

Preferably, each one of the injection hose connecting assemblies includes bolts, which are supported by the fabric layer and partially extend beyond the inner wall of the fabric layer, and a tubular means penetrating through the fabric layer thereby being capable of communicating a gap between the inner wall of the manhole and the outer wall of the fabric layer, with the liquid filler injection hose.

It is preferred that the fabric layer is designed such that its thickness increases stepwise from the upper end to the lower end.

It is also preferable that the thickness of the fabric layer is increased locally where the connector means are provided.

There is also provided a method for lining a manhole which communicates with a pipe at the bottom, comprising the steps of: (a) inserting into the manhole a tubular liner consisting of a fabric layer soaked with a curable liquid resin and at least one connector means for making the inner wall of the tubular liner capable of rigidly receiving connective ends; (b) inserting an inflatable air bag inside the tubular liner; (c) closing the open end of the air bag thereby forming a closed space inside the air bag; (d) supplying pressurized fluid to the closed space to thereby cause the air bag to inflate and press the manhole liner against the inner wall of the manhole; (e) curing the liquid resin to thereby harden the manhole liner; (f) removing the air bag from the manhole; and (g) connecting at least one element to the connector means.

Incidentally, the insertion of this air bag can be conducted either by everting or without everting.

In an embodiment, the element connected to the connector means is a set of ladder steps.

In another embodiment, the element connected to the connector means is at least one liquid filler injection hose. In this case, the method further includes a step of injecting a liquid filler into a gap between the inner wall of the manhole and the outer wall of the fabric layer via the connector means and the liquid filler injection hose(s), followed by removal of the liquid filler injection hose(s).

EFFECTS OF THE INVENTION

In this embodiment, unlike the conventional practices, the ladder steps are not attached directly to the inner wall of the manhole, but they are attached to the manhole liner by means of the pre-installed ladder steps attachment connectors, and the liner is locally made thicker where the steps are attached, so that even if the manhole is too aged to support the steps by itself, the ladder steps are reliably supported by the liner; furthermore, each ladder step is so steadily supported by the entire structure of the liner that even when a step is loaded with a human weight it can withstand the weight without tottering.

Also, by virtue of the pre-installed bolts extending beyond the inner face of the liner, the ladder steps can be easily attached to the liner, and it is now unnecessary to make holes into the inner wall of the hardened liner for attachment of the ladder steps.

Hence, the human labor is much reduced and the operation time is substantially shortened.

Furthermore, according to the above-described embodiment of the manhole lining operation, it is possible to inject the liquid filler into the gap between the manhole and the liner by means of the pre-installed filler injection connector, so that it is now unnecessary to make holes into the inner face of the hardened liner for injection of the filler. Hence, the human labor is much reduced and the operation cost is substantially lowered.

The above and other objects and features of the invention will appear more fully hereinafter in the following description given in connection with the accompanying drawings and the novelty thereof pointed out in the appended claims.

EMBODIMENTS

Next, embodiments of the present invention will be described with reference to the attached drawings.

Embodiment 1

Figure 1:
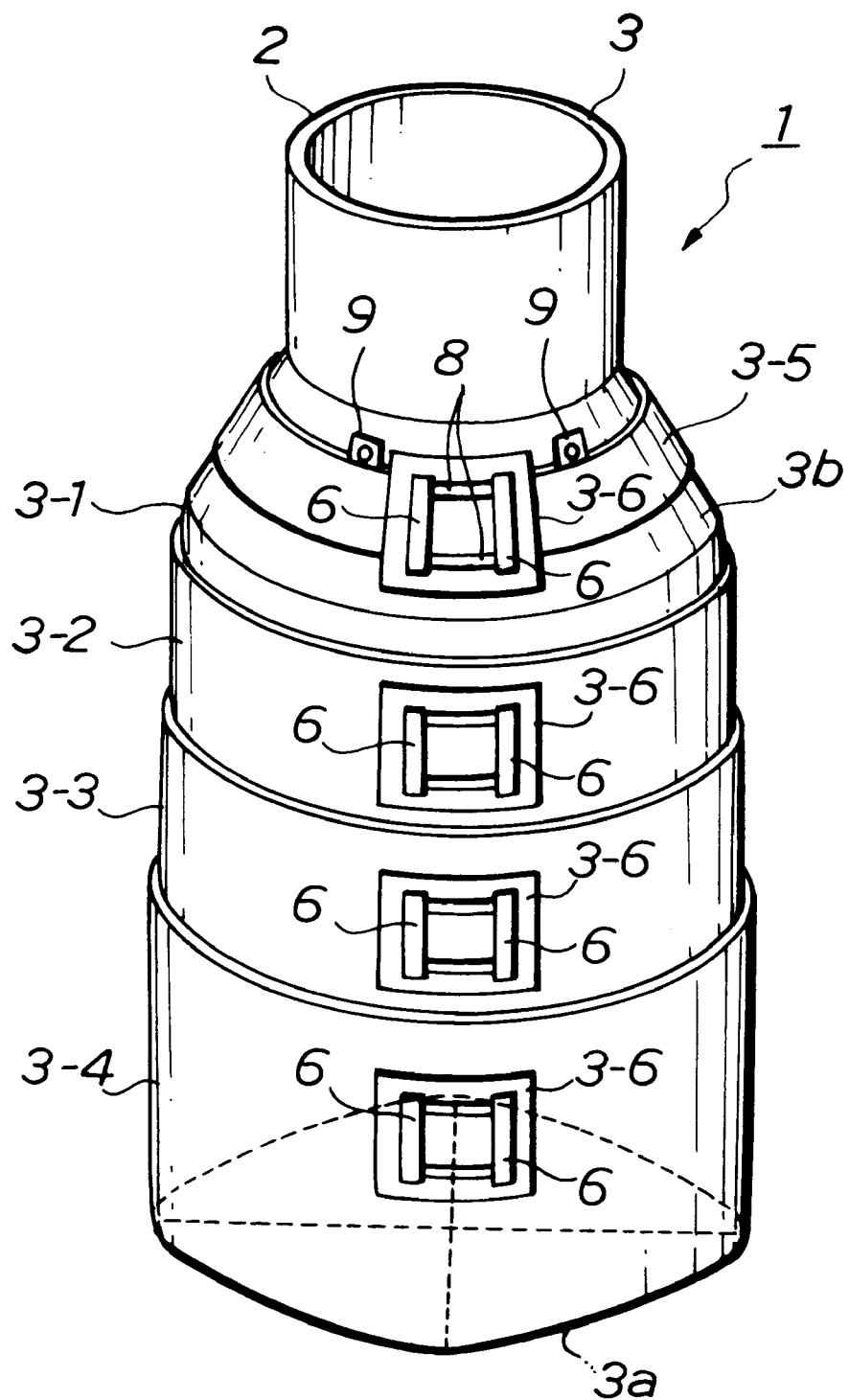
FIG. 1 is a perspective view of a tubular manhole liner according to a first embodiment of the present invention.
Figure 2:
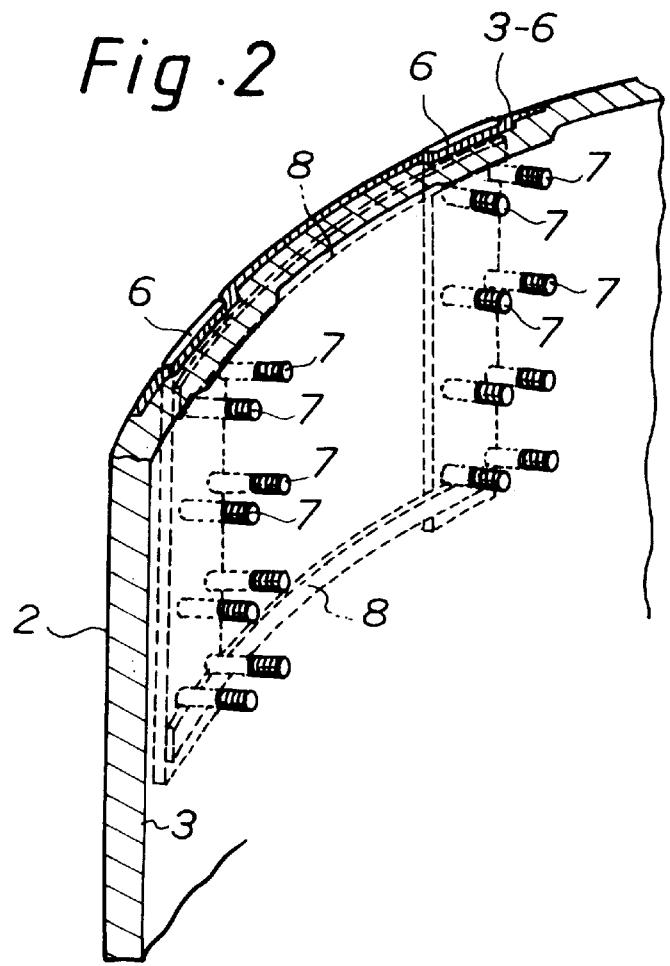
FIG. 2 is a perspective view of that part of the first embodiment manhole liner, as viewed from inside the tubular liner, to which is attached a ladder step attachment base.
Figure 3:
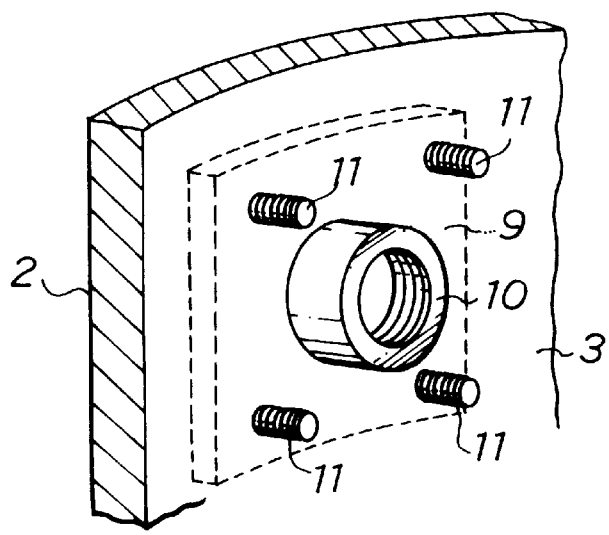
FIG. 3 is a perspective view of that part of the first embodiment manhole liner, as viewed from inside the tubular liner, to which is attached an injection hose attachment base.

FIG. 1 is a perspective view of a tubular manhole liner according to a first embodiment of the present invention; FIG. 2 is a perspective view of that part of the first embodiment manhole liner, as viewed from inside the tubular liner, to which is attached a ladder step attachment base; and FIG. 3 is a perspective view of that part of the first embodiment manhole liner, as viewed from inside the tubular liner, to which is attached an injection hose attachment base.

Figure 15:
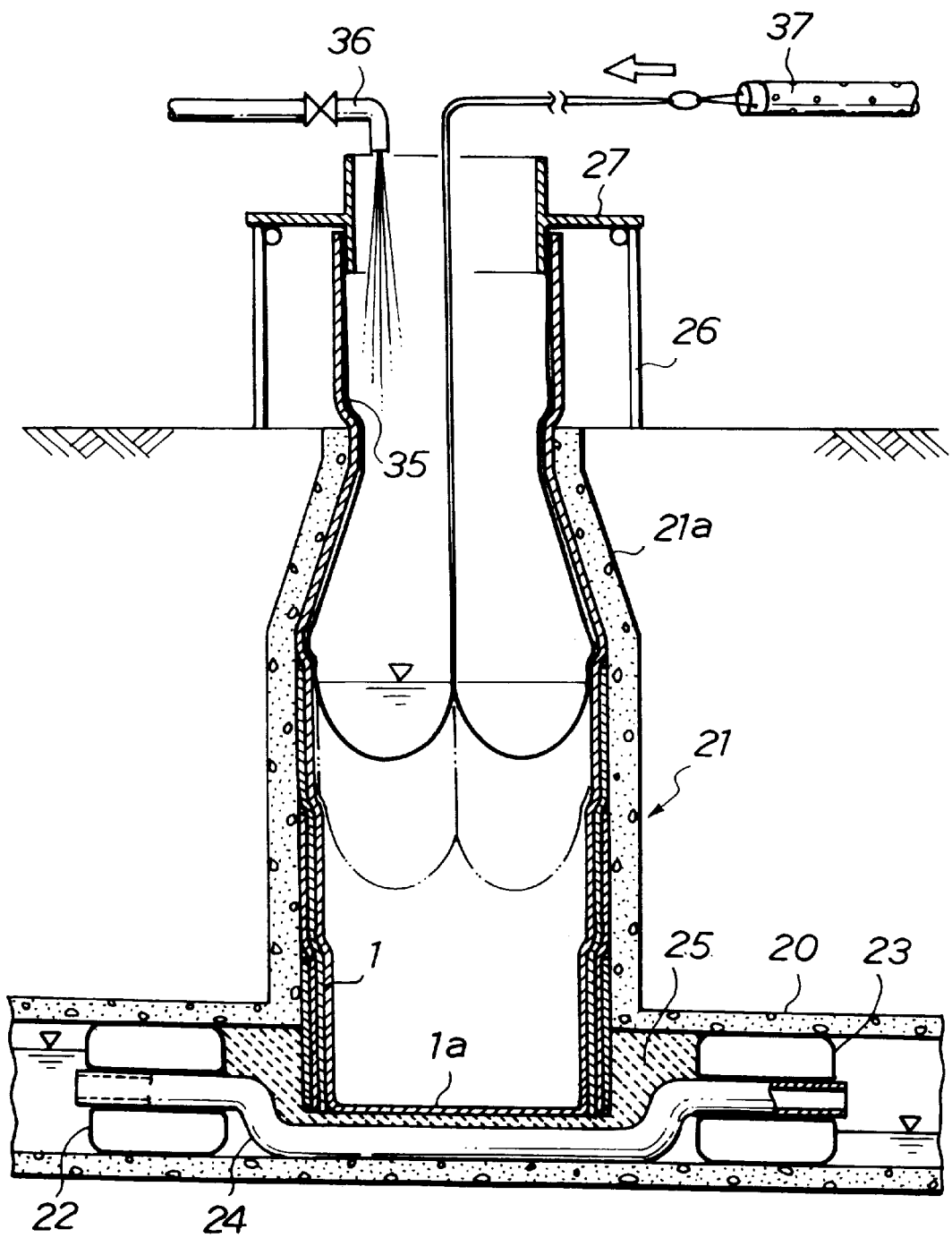
FIG. 15 is a sectional view of a site containing a manhole, illustrating a step of the manhole lining method according to the first embodiment of the invention.

First a manhole liner 1 of the present invention will be explained. A lengthy rectangular resin-absorbent fabric sheet 3-1 is wrapped into tubular form so that the free edges come into butting relationship and are sewn together by means of a sewing machine. The bottom 3a is closed to form a bag, and the sheet bag 3-1 is made to have a shoulder portion 3b so as to tally with a reducer portion 21a of a manhole 21 (ref. FIG. 15) (reducer fitting).

A rectangular resin-absorbent fabric sheet 3-2 is wrapped about and bonded onto the sheet bag 3-1 in a manner such that the sheet 3-2 forms an outer fabric layer which covers the sheet bag 3-1 from the latter's bottom edge to the vicinity of the shoulder portion 3b (ref. FIG. 1). Next, another rectangular resin-absorbent fabric sheet 3-3 is wrapped about and bonded onto the sheet 3-2 in a manner such that the sheet 3-3 forms a third fabric layer which covers the fabric layer 3-2 from the latter's lower edge to the vicinity of the upper end. Similarly a still another rectangular resin-absorbent fabric sheet 3-4 is applied to the fabric layer 3-3, and forms the fourth and outermost fabric layer. Thus, the overall thickness of the fabric sheets increases stepwise toward the lower end of the manhole liner 1. Also, a rectangular resin-absorbent fabric sheet 3-5, which has a relatively small width, is wrapped about and bonded onto the shoulder portion (reducer-fitted portion) 3b of the sheet bag 3-1 to cover part of the latter. A plurality of rectangular ladder step attachment bases 3-6 (four in this embodiment) are each attached to the outer faces of the fabric layers 3-2, 3-3, 3-4, and 3-5, respectively, to form bases for receiving ladder steps. The ladder step attachment bases 3-6 are arranged in a row extending in the direction of the depth of the manhole liner bag 1. Thus, the overall thickness of the fabric sheets is locally increased at the positions where the ladder step attachment bases 3-6 are attached by the thickness of the bases 3-6.

As shown in FIG. 1, the outer face of each ladder step attachment base 3-6 is provided with a pair of narrow plates 8 attached thereto in a manner such that the plates 8 are substantially apart from each other, and are parallel to each other as well as to the horizontal sides of the base 3-6. The horizontal plates 8 are made of a metal or a synthetic resin having a relatively low elasticity.

Furthermore, as shown in detail in FIG. 2, a pair of narrow plates 6 are attached to the outer face of each ladder step attachment base 3-6 in a manner such that the plates 6 are substantially apart from each other, and are parallel to each other as well as to the vertical sides of the base 3-6, and extend over the horizontal plates 8. The vertical plates 6 are made of a metal (e.g. stainless steel) or a synthetic resin. The attachment of the vertical plates 6 is effected by means of a plurality of bolts 7, whose heads are fixedly embedded in the vertical plates 6 and whose threaded ends are made to penetrate through the resin-absorbent fabric layer 3 and extend substantially from the inner wall thereof. Some of the bolts 7 also penetrate the horizontal plates 8 as well, and thus the vertical plates 6 are interconnected to each other via the horizontal plates 8. Incidentally, in this embodiment each vertical plate 6 is provided with eight bolts 7, which are arranged in two rows of four pieces each.

Figure 14:
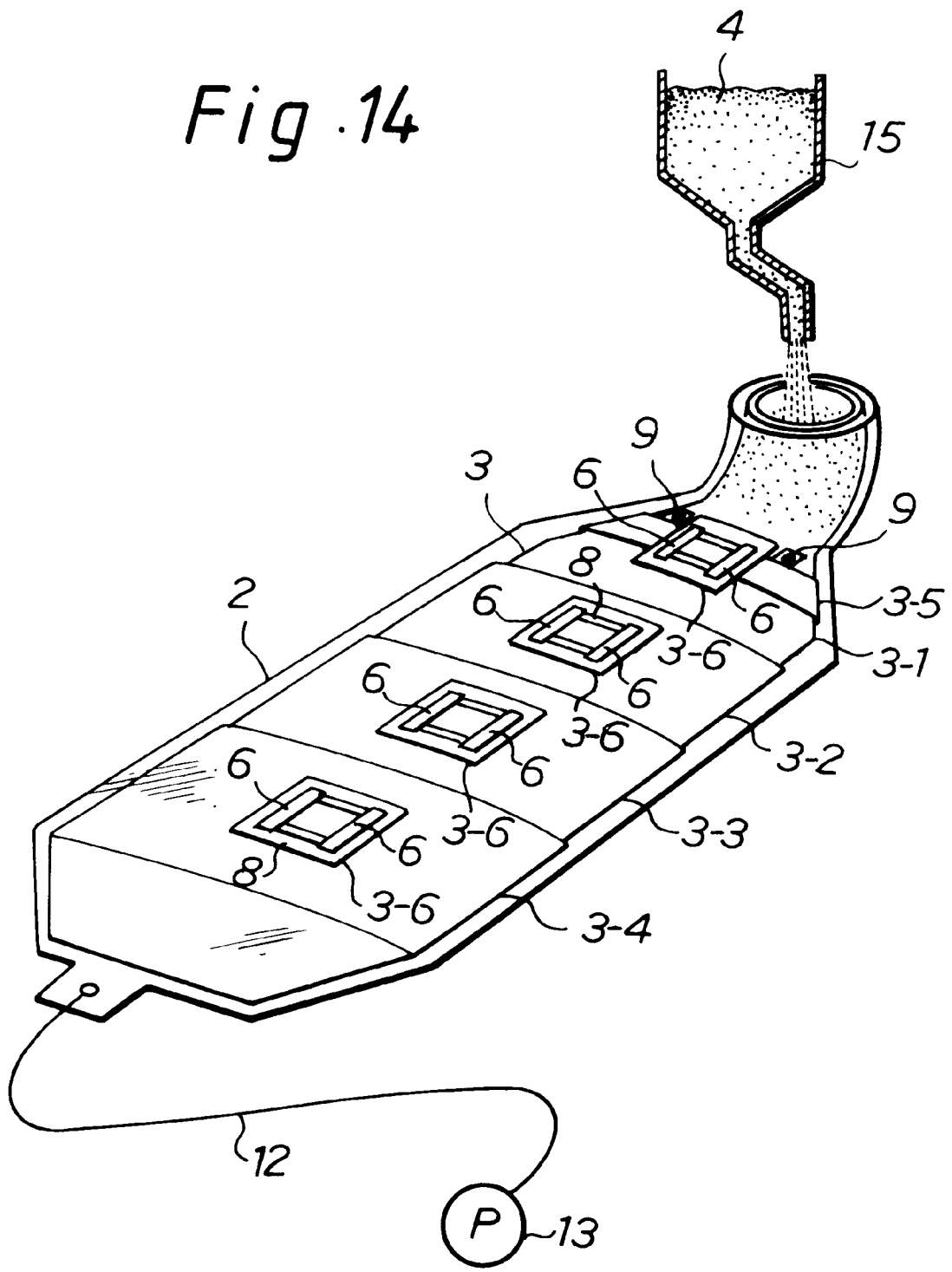
FIG. 14 is a perspective view of the first embodiment manhole liner, illustrating a yet further step of its manufacturing process.

The peripheral outer face of the resin-absorbent fabric layer 3 together with all the attachments of the vertical plates 6 and the horizontal plates 8 is lined with a highly airtight plastic film 2. Also, the resin-absorbent fabric sheet layer 3 is soaked with a thermosetting liquid resin 4 (ref. FIG. 14).

Figure 5:
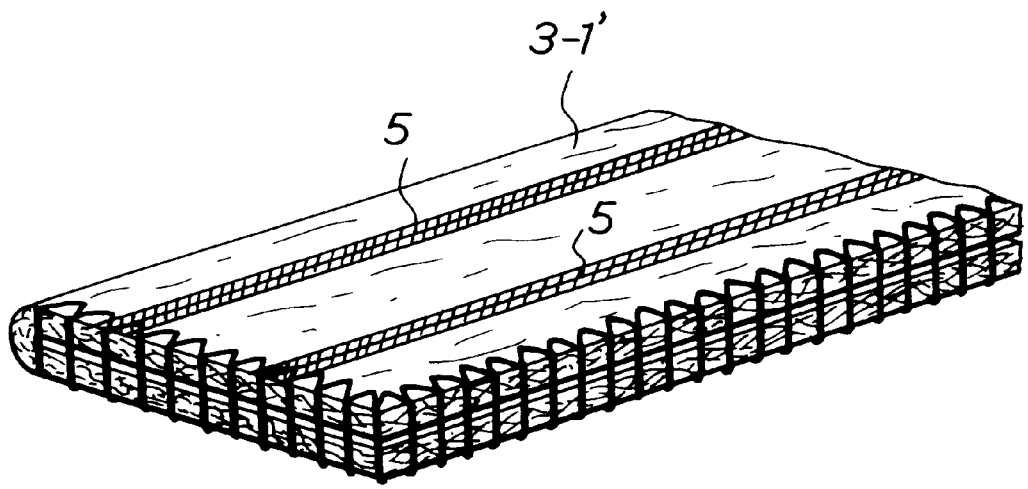
FIG. 5 is a perspective view of part of the first embodiment manhole liner, illustrating another step of its manufacturing process.

Incidentally, the elements 3-1 through 3-6, which constitute the resin-absorbent fabric layer 3, are a nonwoven felt of a synthetic resin such as polyester, nylon, polypropylene, and acrylic resin, or a glass fiber cloth, glass fiber mat, or glass felt, or a nonwoven felt of a mixture of any of said synthetic resins and glass fiber. Ribbons of glass cloth 5 are bonded to the outer face of the resin-absorbent fabric sheet 3-1 as reinforcer (ref. FIG. 5) in a manner such that the glass cloth ribbons 5 extend in parallel with each other and in the direction of the depth of the manhole. The airtight plastic film 2, with which the peripheral outer face of the resin-absorbent fabric layer 3 is lined is made of a resin such as polyurethane and polyethylene. The thermosetting liquid resin 4 to be absorbed through the resin-absorbent fabric layer 3 may be a polyester resin, an epoxy resin, a vinyl ester resin, etc.

Now, as shown in FIG. 1, a pair of injection hose attachment bases 9 are provided on the shoulder portion 3b of the sheet bag 3-1, one on each side of the uppermost base 3-6; the bases 9 are made of a metal (e.g. stainless steel) or of a synthetic resin. More specifically, as shown in FIG. 3, each injection hose attachment base 9 is formed with an injection port 10 and is attached to the surface of the shoulder portion 3b by means of the injection port 10 and four bolts 11, which penetrate through the fabric sheet 3-1 and extend substantially from the inner wall thereof.

Next, a method for manufacturing the liner bag 1 of the above-described construction will be explained with reference to FIGS. 4 through 14. Incidentally, FIGS. 1 through 14 illustrate the method in the order of manufacturing the liner bag 1.

Figure 4:
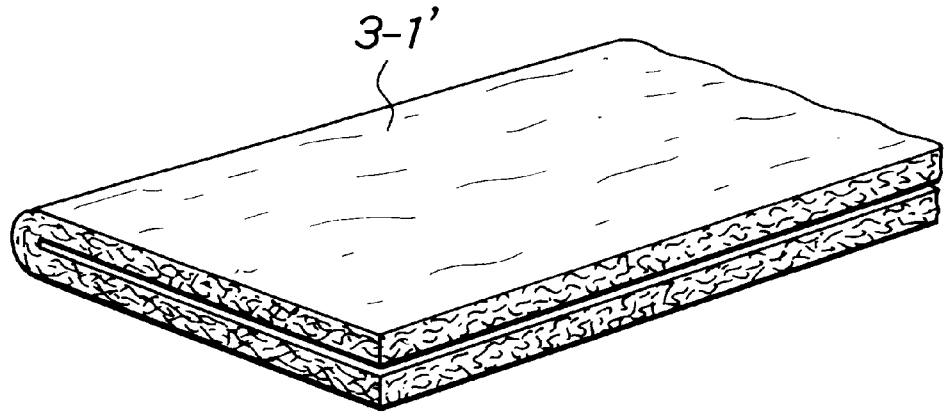
FIG. 4 is a perspective view of part of the first embodiment manhole liner, illustrating a step of its manufacturing process.

In making the manhole liner bag 1 of FIG. 1, a nonwoven fabric sheet cloth 3-1' is doubled, as shown in FIG. 4, and this double cloth is deformed in a manner such that the resulting liner bag 1 will fit the manhole 21 (ref. FIG. 15). Thereafter, the edges of the double cloth are sewn together, as shown in FIG. 5. The glass cloth ribbons 5 are bonded to the outer face of the resin-absorbent fabric sheet 3-1 in a manner such that the glass cloth ribbons 5 extend in parallel with each other and in the direction of the depth of the manhole 12. Incidentally, the glass cloth ribbons 5 are provided with a view to prevent the liner bag 1 from expanding and thus to stabilize the size of the liner bag 1, as well as to reinforce the bag 1. It is possible to bury the glass cloth ribbons 5 in the nonwoven fabric sheet cloth 3-1'.

Figure 6:
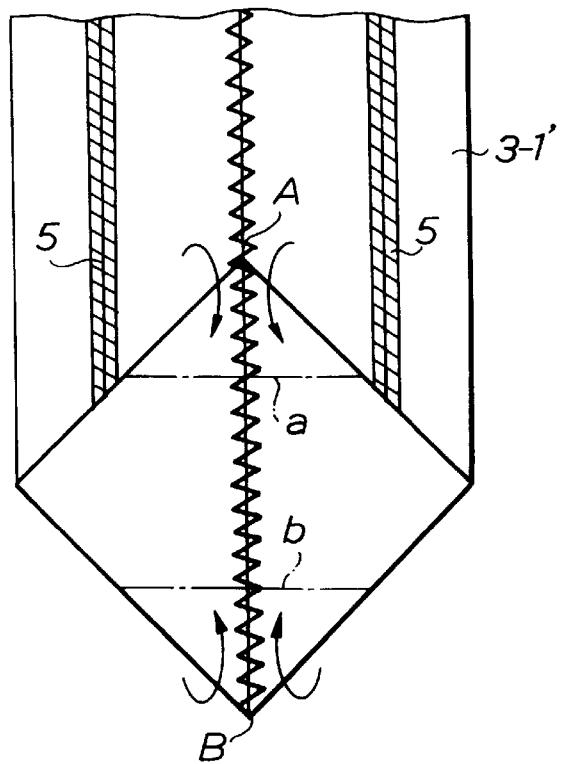
FIG. 6 is a perspective view of part of the first embodiment manhole liner, illustrating still another step of its manufacturing process.
Figure 7:
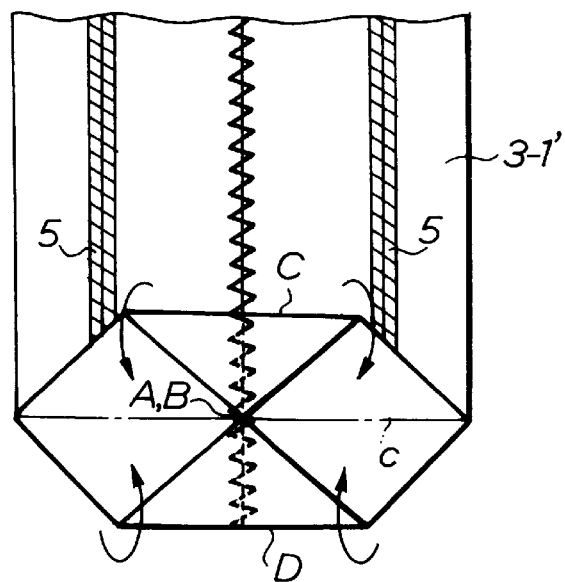
FIG. 7 is a perspective view of part of the first embodiment manhole liner, illustrating yet another step of its manufacturing process.

Next, the bottom portion of the nonwoven fabric sheet cloth 3-1' is folded to form a square bottom, as shown in FIG. 6; then, the square bottom is dog-eared along the one-dot chain lines a and b, whereby the corners A and B of the square bottom meet each other, as shown in FIG. 7. The edges of the dog-ears are bonded to the square bottom (now hexagonal) by fusion or with an adhesive. Thereafter, the hexagonal bottom portion of the nonwoven fabric sheet cloth 3-1' is further folded along the one-dot chain line c of FIG. 7, whereby the sides C and D coincide with each other, and the resin-absorbent fabric sheet 3-1 now becomes a bag complete with a bottom, as shown in FIG. 8.

Figure 8:
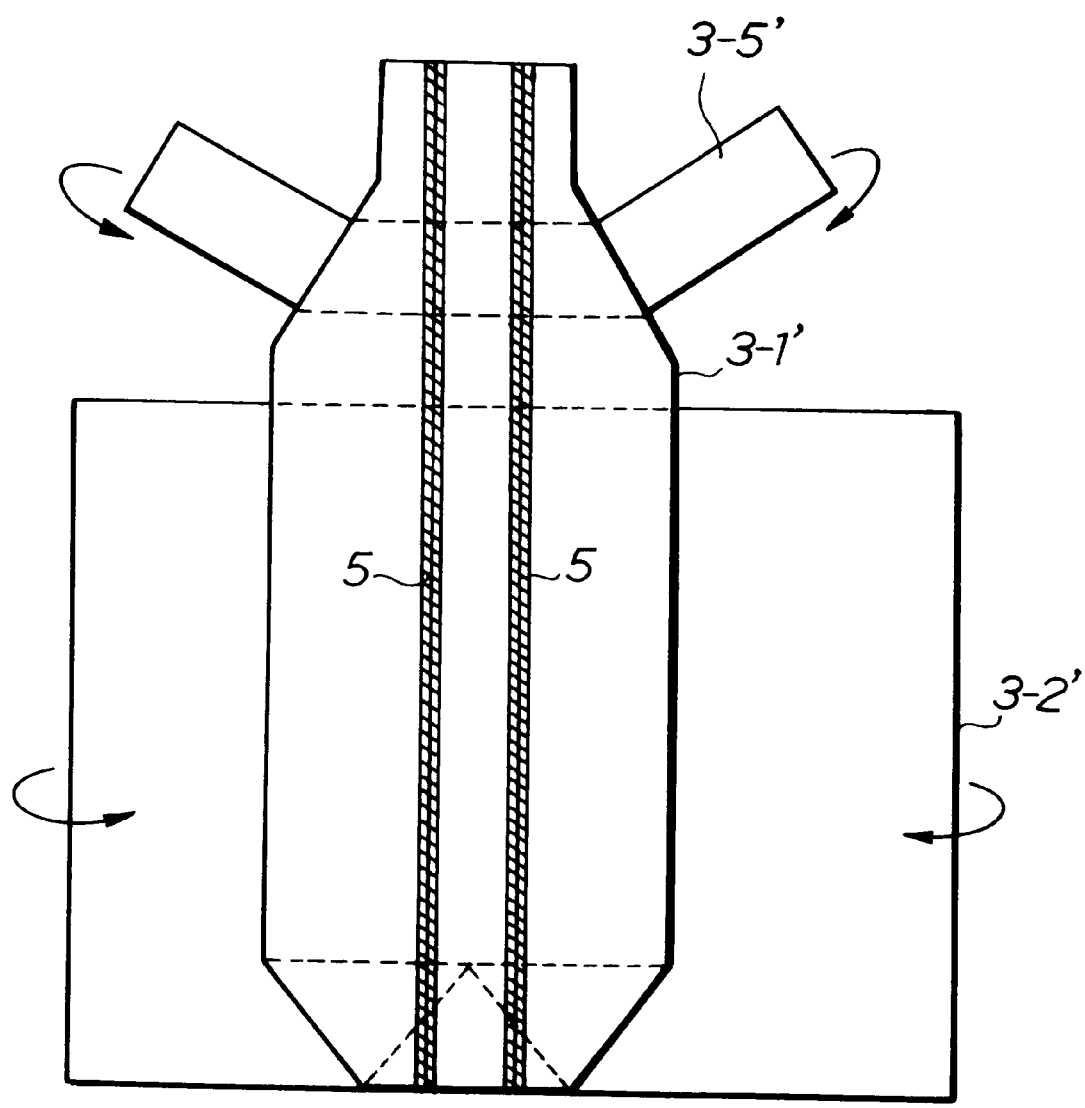
FIG. 8 is a perspective view of the first embodiment manhole liner, illustrating a further step of its manufacturing process.
Figure 9:
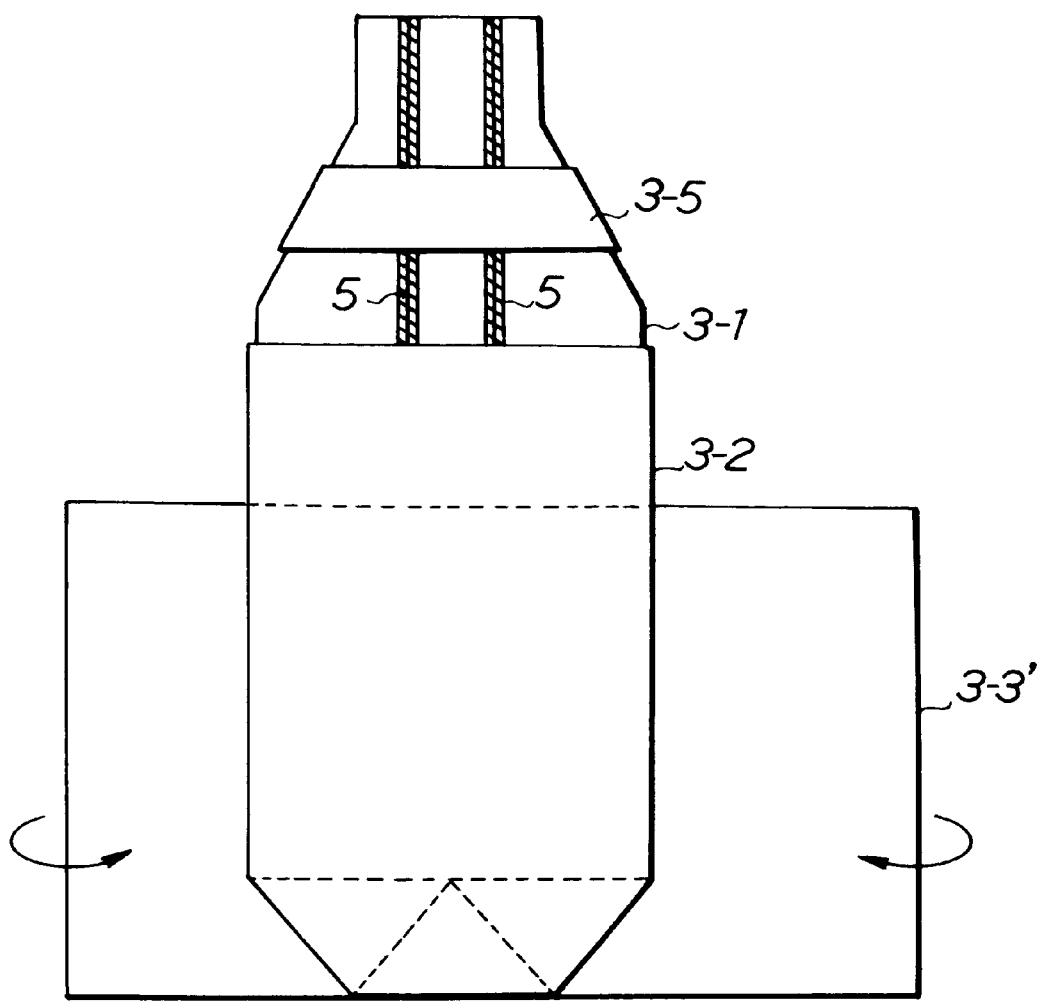
FIG. 9 is a perspective view of the first embodiment manhole liner, illustrating a next step of its manufacturing process.
Figure 10:
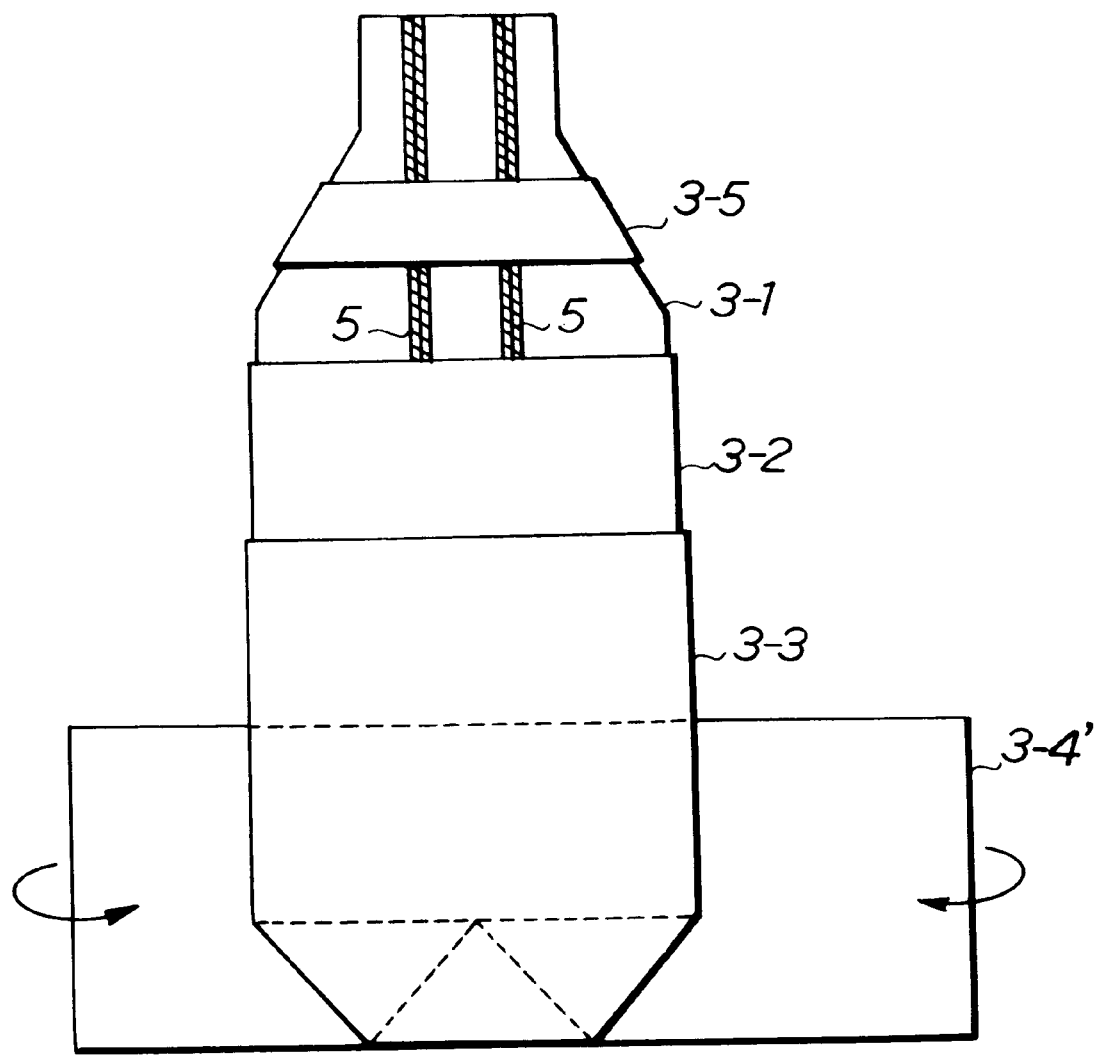
FIG. 10 is a perspective view of the first embodiment manhole liner, illustrating another step of its manufacturing process.
Figure 11:
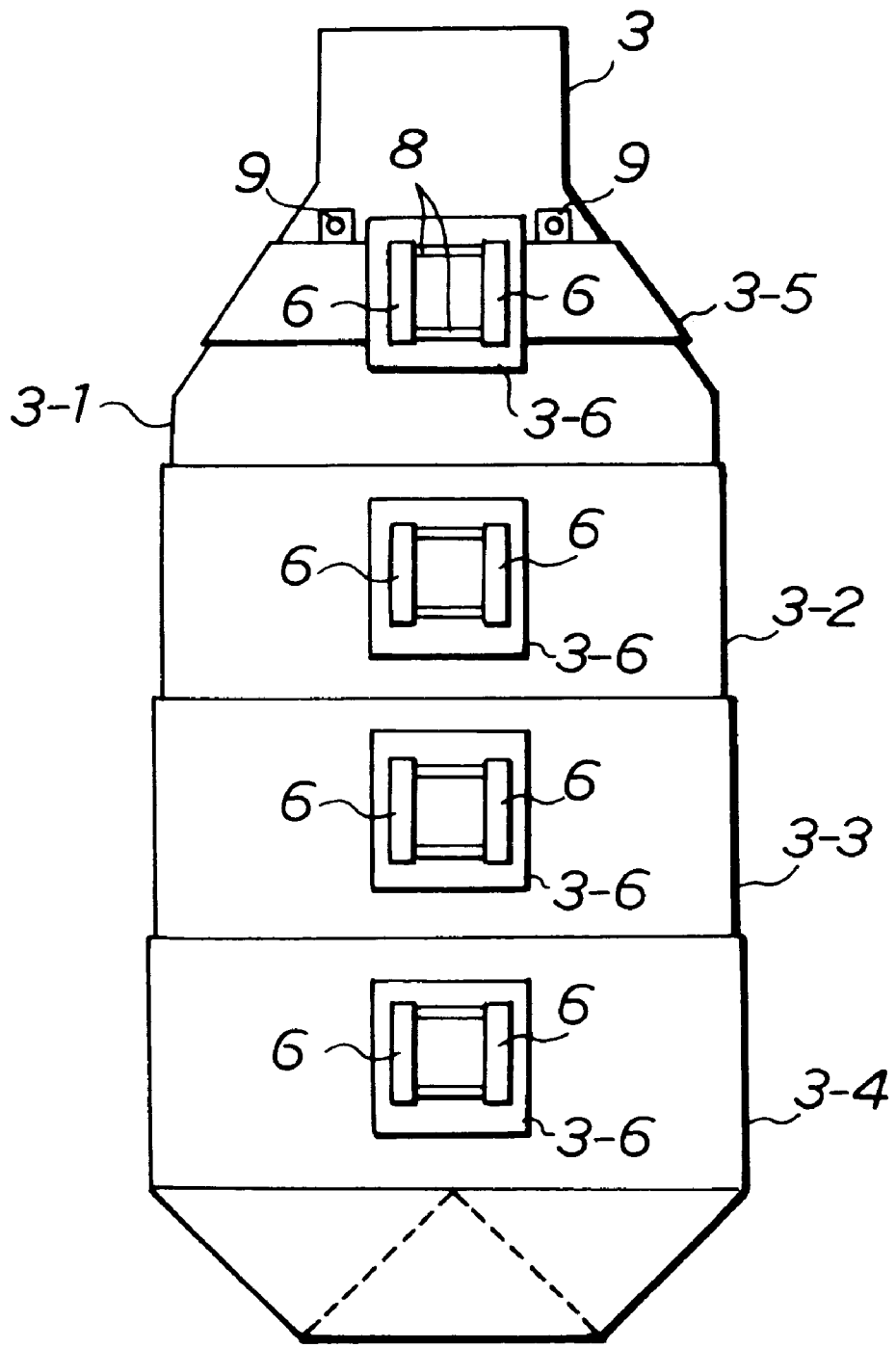
FIG. 11 is a perspective view of the first embodiment manhole liner, illustrating a further step of its manufacturing process.

When the sheet bag 3-1 is thus obtained, the narrow rectangular resin-absorbent fabric sheet 3-5' is wrapped round and bonded onto the reducer-fitted portion of the sheet bag 3-1 by fusion or with an adhesive, as shown in FIG. 8. At the same time, the rectangular resin-absorbent fabric sheet 3-2' is wrapped about and similarly bonded onto the sheet bag 3-1 to cover the latter from the bottom edge to the vicinity of the reducer-fitted portion. Thus, the sheet bag 3-1 is now laminated with the fabric layers 3-5 and 3-2. Next, in the same manner as above, another rectangular resin-absorbent fabric sheet 3-3' is wrapped about and bonded onto the fabric layer 3-2 to cover the latter from the lower edge to the vicinity of the upper end, as shown in FIG. 9; then, another rectangular resin-absorbent fabric sheet 3-4' is wrapped about and bonded onto the fabric layer 3-3 to cover the latter from the lower edge to the vicinity of the upper end, as shown in FIG. 10. As the result, the resin-absorbent manhole liner bag 3 is obtained, which is laminated with the partially covering layers 3-1 through 3-5, as shown in FIG. 11. The thickness of the laminated bag 3 increases stepwise toward the bottom, due to the layers 3-2, 3-3, and 3-4. Incidentally, the fabric layer 3-5 is provided for the purpose of increasing the second moment of area of the entire structure of the manhole liner bag 1 so as to prevent deformation of the liner bag 1.

When the resin-absorbent laminated bag 3 is obtained as described above, four rectangular ladder step attachment bases 3-6 are each attached to the outer faces of the fabric layers 3-2, 3-3, 3-4, and 3-5, respectively, and then, a pair of the narrow plates 6 are attached to each ladder step attachment base 3-6, and also a pair of the injection hose attachment bases 9 are attached to the reducer-fitted portion of the resin-absorbent laminated bag 3, as shown in FIG. 11 (ref. FIGS. 2 and 3 too).

Figure 12:
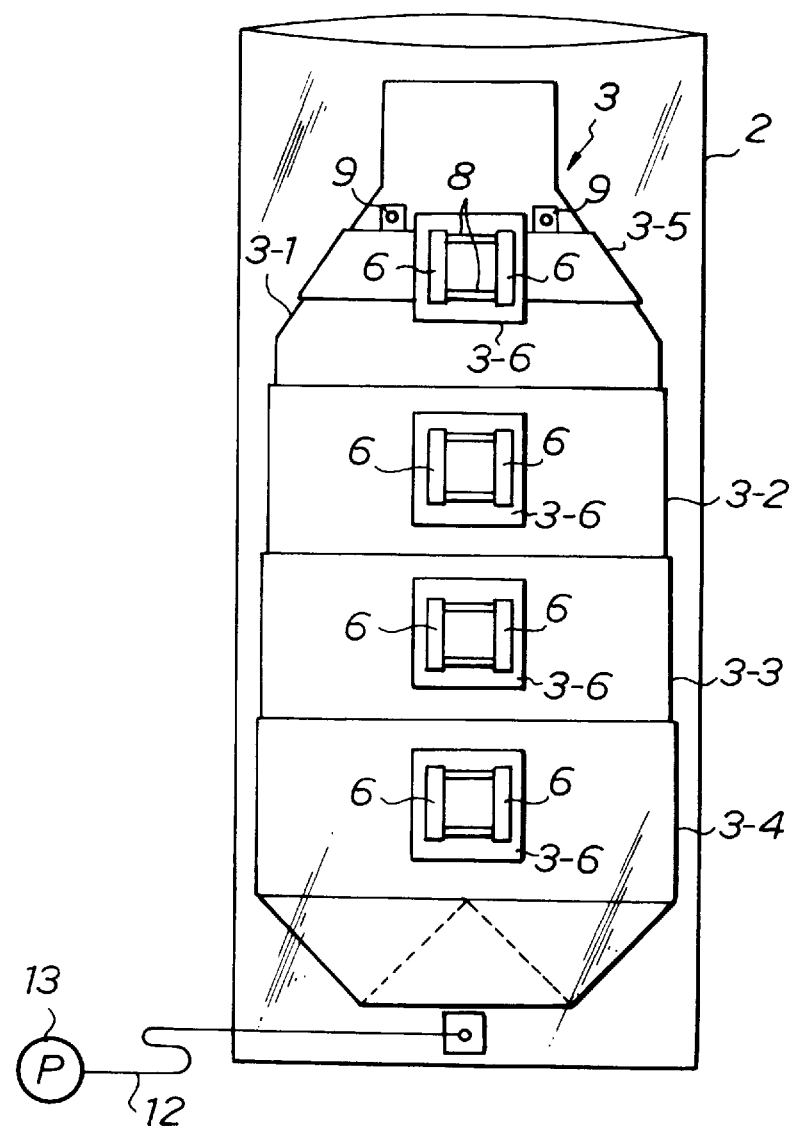
FIG. 12 is a perspective view of the first embodiment manhole liner, illustrating a still further step of its manufacturing process.
Figure 13:
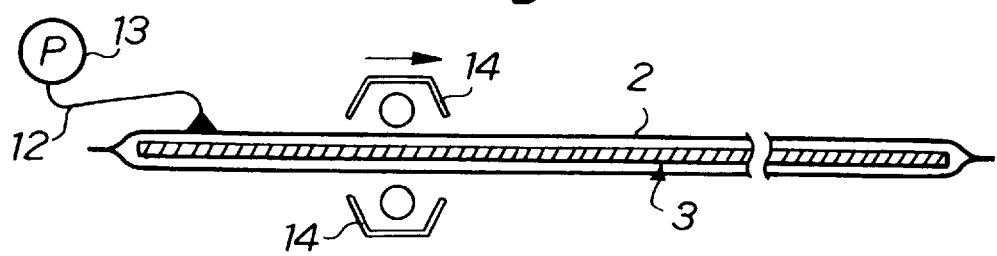
FIG. 13 is a perspective view of the first embodiment manhole liner, illustrating a still further step of its manufacturing process.

Next, the resin-absorbent bag 3 is flattened, and inserted into a larger rectangular bag of the plastic film 2, which is opened at its one end only, as shown in FIG. 12. One end of the resin absorbent bag 3 is brought close to the suction end of a vacuum hose 12 connected to a vacuum pump 13. Then, the vacuum pump 13 is operated to suck at the resin-absorbent bag 3, whereupon the plastic film 2 is closely pressed upon the surfaces of the resin-absorbent bag 3, as shown in FIG. 13. Next, while things are maintained the way they are in FIG. 13, a heating device, consisting of an upper heater 14 and a lower heater 14, is passed over the length of the plastic film bag 2 at a predetermined velocity, from the closed end of the bag 2 to the open end, as shown by an arrow in FIG. 13; then, the plastic film 2 is fused by the heat and permanently adhered to the surfaces of the resin-absorbent bag 3 from its bottom to the top. When the entire length of the resin-absorbent bag 3 is thus laminated with the plastic film 2, the outer surfaces of the resin-absorbent bag 3 becomes airtight by virtue of the airtight plastic film layer 2.

When the fusion of the plastic film 2 over the bag 3 is completed, the heating device 14 is removed, and then the resin-absorbent fabric layer 3 is impregnated with the thermosetting liquid resin 4, in a manner as illustrated in FIG. 14.

More specifically, while the thermosetting liquid resin 4 contained in a resin reservoir 15 is charged into the opening of the resin-absorbent bag 3, the vacuum pump 13 is operated to suck at the resin-absorbent bag 3; whereupon the liquid resin 4 is drawn by the negative pressure created in the resin-absorbent fabric and permeates uniformly through the whole body of the resin-absorbent bag 3. Thus, the manhole liner 1, as shown in FIG. 1, is obtained.

When the preparation of the manhole liner 1 is completed, as described above, the liner 1 consisting of the resin-absorbent bag 3 covered up with the plastic film 2 is preserved in ice water and transported to the sewer sites under this low temperature condition. On this occasion, since the resin-absorbent bag 3 of the liner 1 is sealed with the highly airtight plastic film 2, the ice water does not wet the resin-absorbent fabric layer and the thermosetting liquid resin 4 held by the resin-absorbent fabric layer is reliably kept from starting to cure.

When the manhole liner 1 is brought to the manhole repair site to be used to line the manhole, the bottom edge of the plastic film bag 2 is slit open, and the bottom portion 3a of the resin-absorbent fabric bag 3 is unfolded, and then the liner bag 1 is inflated to have a voluminous inner space.

Figure 20:
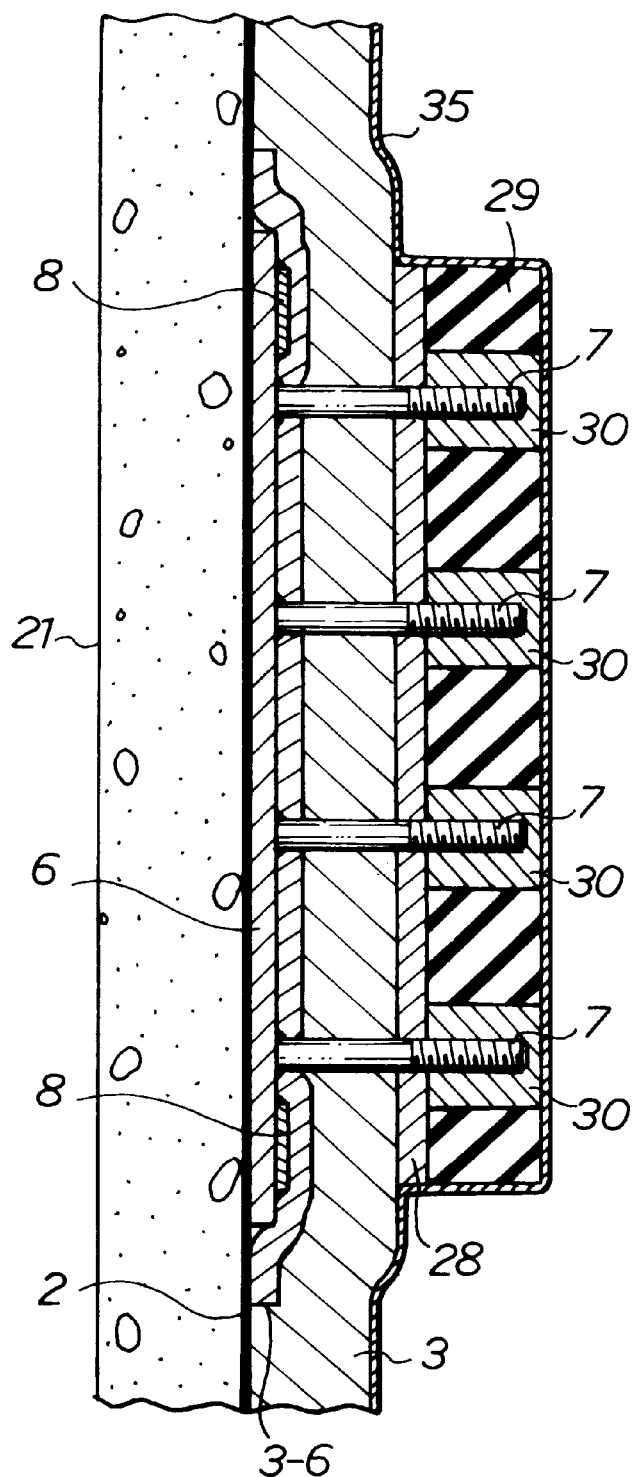
FIG. 20 is a sectional view of the ladder step attachment base, illustrating how it is disposed during the lining operation according to the first embodiment of the invention.
Figure 21:
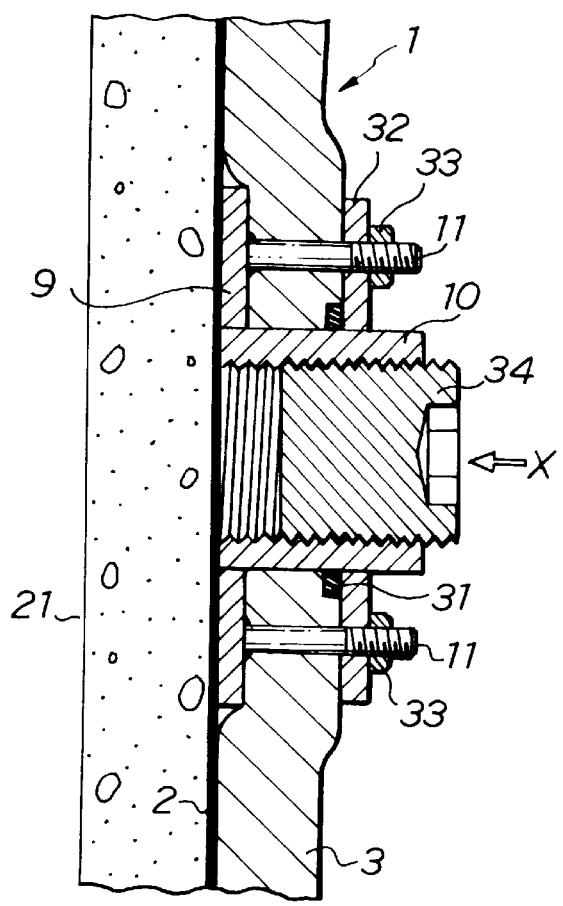
FIG. 21 is a sectional view of the injection hose attachment base, illustrating how it is disposed during the lining operation according to the first embodiment of the invention.
Figure 22:
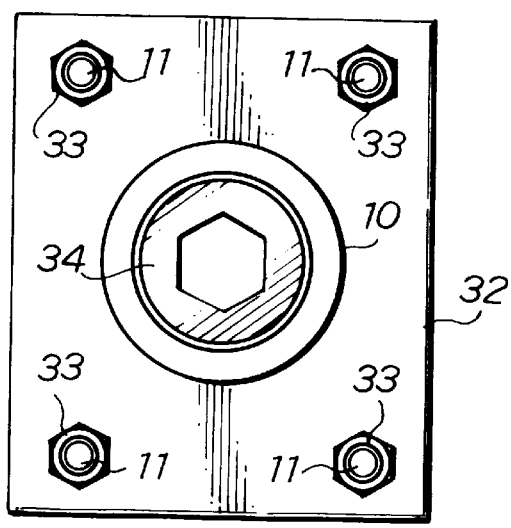
FIG. 22 is a view of the injection hose attachment base as seen in the direction of the arrow X of FIG. 21.
Figure 23:
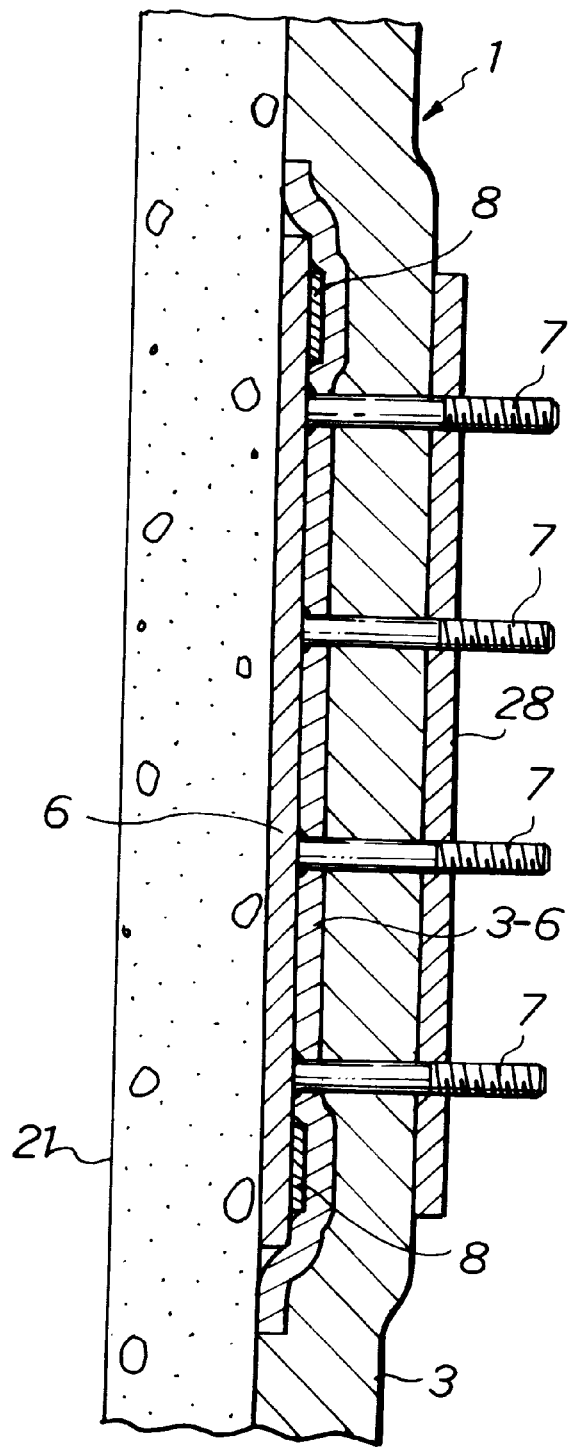
FIG. 23 is a sectional view of the ladder step attachment base, illustrating how it is disposed after the lining operation according to the first embodiment of the invention.
Figure 24:
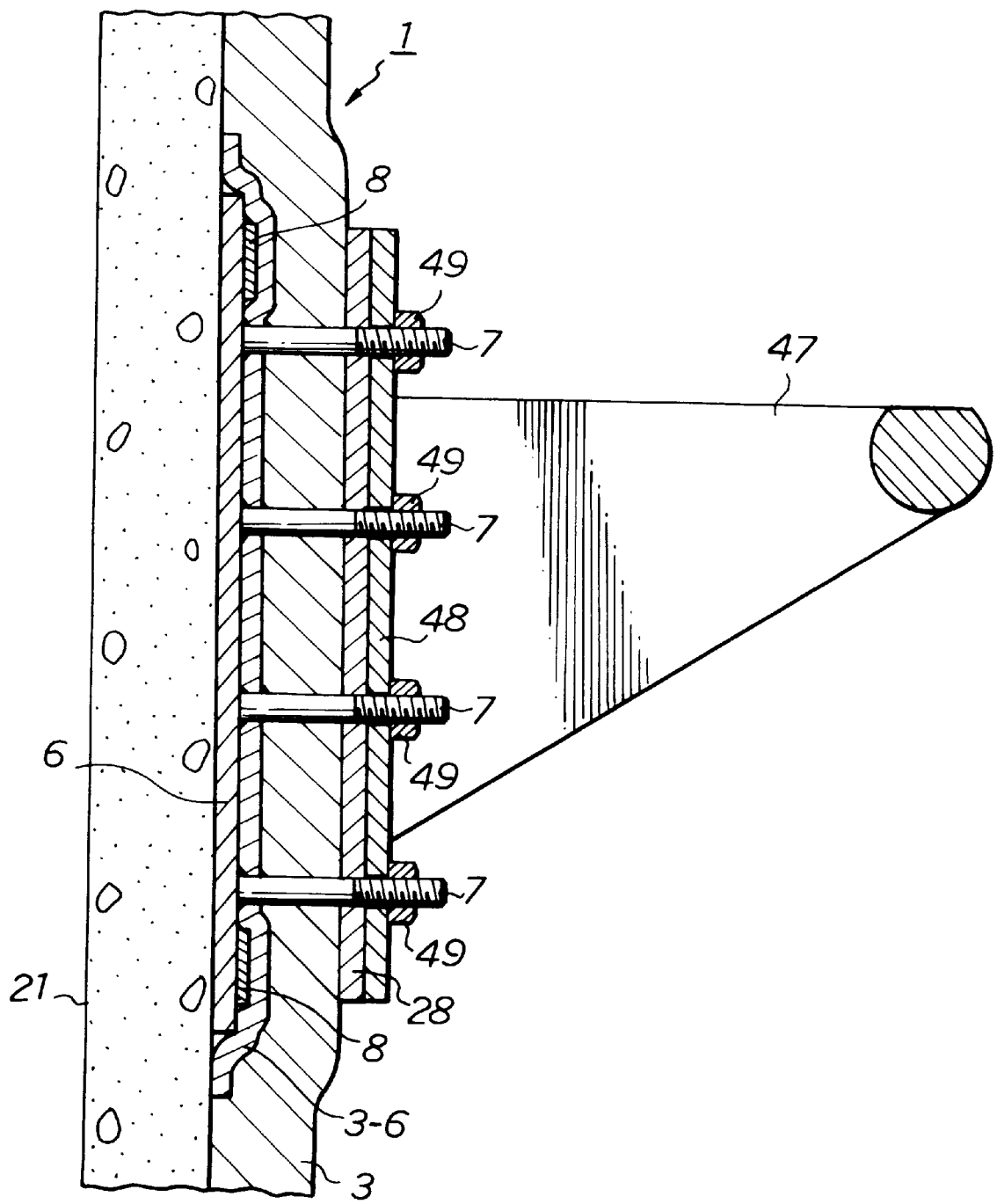
FIG. 24 is a sectional view of a ladder step, illustrating how it is attached in the first embodiment of the invention.
Figure 25:
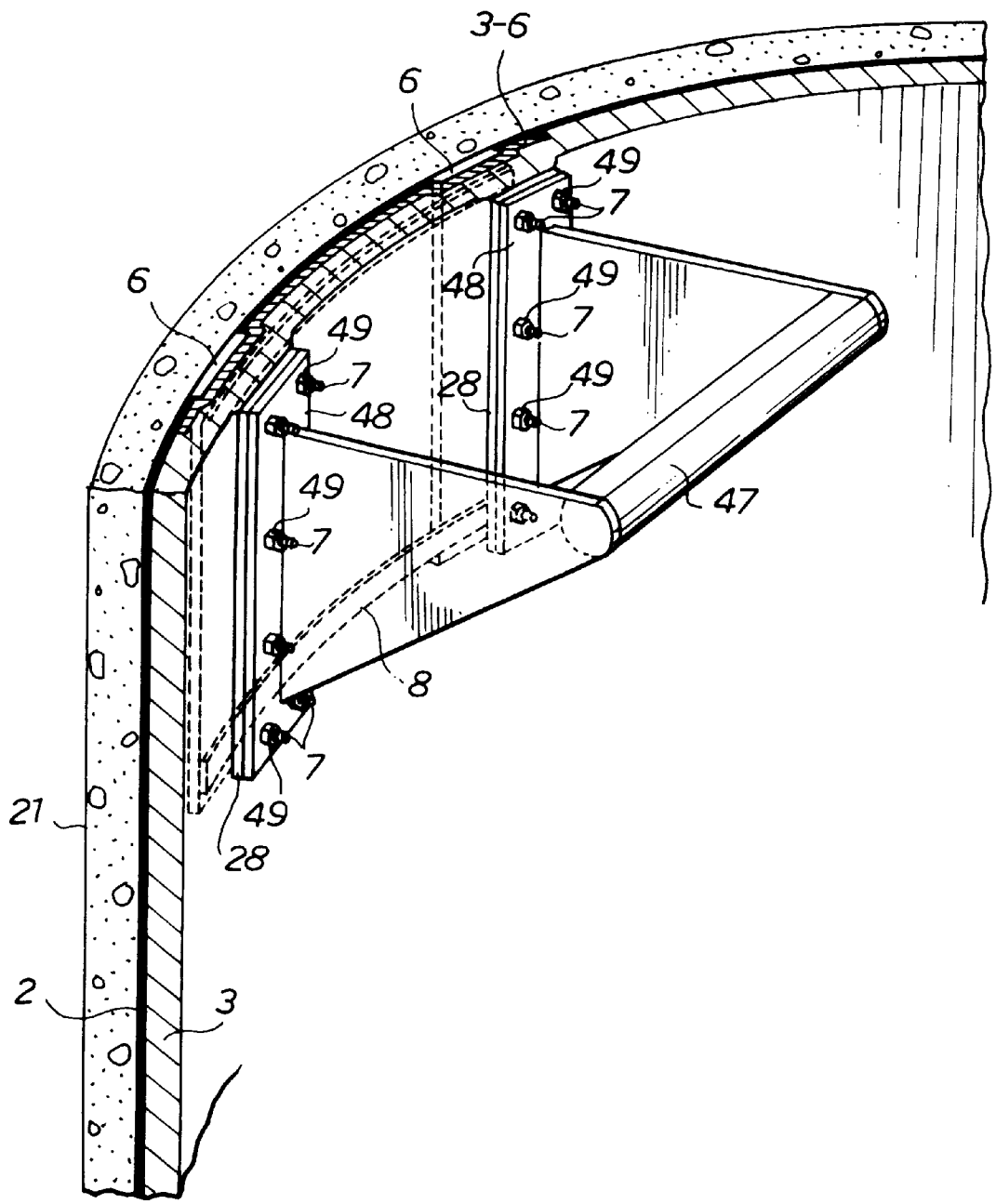
FIG. 25 is a perspective view of the ladder step, illustrating how it is attached in the first embodiment of the invention.
Figure 26:
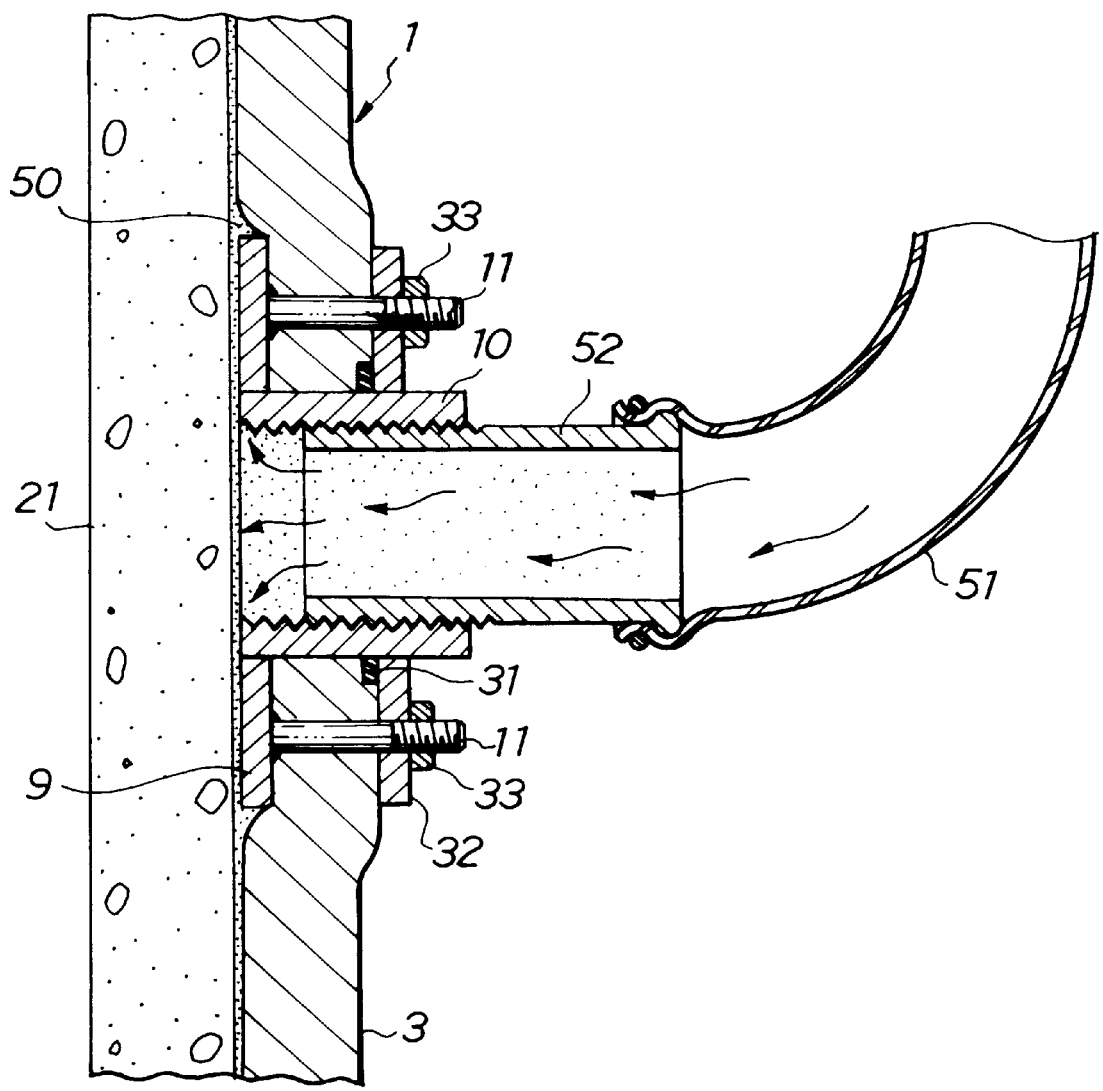
FIG. 26 is a sectional view of the injection hose attachment base, illustrating how a liquid filler is injected into a gap in the first embodiment of the invention.

Next, we will explain the inventive method for lining a manhole wherein the manhole liner 1, obtained in a manner as described above, is used, with reference to FIGS. 15 through 26. Incidentally, FIGS. 15 through 19 illustrate the inventive method for lining a manhole in the order of procedure, FIG. 20 illustrates how a ladder step attachment base is disposed during the lining operation, FIG. 21 illustrates how an injection hose attachment base is disposed during the lining operation, FIG. 22 is a view of the injection hose attachment base as seen in the direction of the arrow X of FIG. 21; FIG. 23 illustrates how the ladder step attachment base is disposed after the lining operation, FIG. 24 illustrates how a ladder step is attached, FIG. 25 is a perspective view of the ladder step, and FIG. 26 illustrates how the injection hose attachment base, illustrating how a liquid filler is injected.

In the method for lining a manhole, according to the present invention, two water stop plugs 22, 23 having an aperture in them are installed in the pipe 20, one at a location upstream to the manhole 21 and the other downstream to the manhole 21, as shown in FIG. 15, and a hose 24 is passed through the apertures of the water stop plugs 22, 23 so that the drain water in the upstream side of the plug 22 can flow in the hose 24 and run down into the downstream side of the plug 23. Furthermore, the space of the pipe 20 isolated between the water stop plugs 22, 23 is partially filled with a liquid absorbent filler 25 such as sawdust and rice bran. Now, before lining the manhole 21, a set of ladder steps, not shown, which were fastened to the inner wall of the manhole 21, have been cut and removed.

Now, the upper part of the manhole 21 is formed with a reducer portion 21a where the hole is converged upward. The manhole liner 1 has been inserted (not by eversion) in the manhole 21 from above the ground in a manner such that the bottom portion 1a of the liner 1 abuts on the bottom of the manhole 21 (ref. invert portion 21b in FIG. 19). The upper open end of the liner 1 extends outside the manhole 21 and is fastened around the lower periphery of an adaptor collar 27, which is supported by a stage 26 installed on the ground. Incidentally, at this time, as shown in FIG. 20, that portion of each bolt 7 of the plates 6 attached to the ladder step attachment bases 3-6 which extends from the inner side surface of the resin-absorbent fabric layer 3 is passed through a plate 28 made of a metal (such as stainless steel) or a synthetic resin, and the screw end portion of each bolt 7 is received in a cap 30, which is supported by a rubber plate 29. Also, as shown in FIG. 21, that portion of each injection port 10 of the injection hose attachment bases 9 which extends from the inner side surface of the resin-absorbent fabric layer 3 is passed through a stopper 31 and a plate 32, which are made of a metal (such as stainless steel) or a synthetic resin, and that portion of each bolt 11 which extends from the inner side surface of the resin-absorbent fabric layer 3 is passed through the plate 32. The plate 32 is pressed upon the resin-absorbent fabric layer 3 by means of nuts 33, which are screwed tightly on the respective screw end portions of the bolts 11, whereby the resin-absorbent fabric layer 3 is held firmly between the injection hose attachment bases 9 and the plates 32. Each injection port 10 is blocked by a cap 34 screwed into the injection port 10.

Now, an intra-liner bag 35, which is made of a highly airtight plastic film and generally tubular with its tail end closed, has its one end everted a little to create an annular pocket and fastened around the lower periphery of the adaptor collar 27; when the insertion of the manhole liner 1 into the manhole 21 is completed, water is charged from a water hose 36 into the annular pocket formed by the slight eversion of the intra-liner bag 35, as shown in FIG. 15. Thereupon, the intra-liner bag 35 is caused by the water pressure (the water weight) to evert and be inserted downwardly along the manhole liner 1. Incidentally, it is so arranged that the diameter of the intra-liner bag 35 is greater than the minimum inner diameter of the liner 1, which is at the upper end of the reducer portion 21a of the manhole 21.

Figure 16:
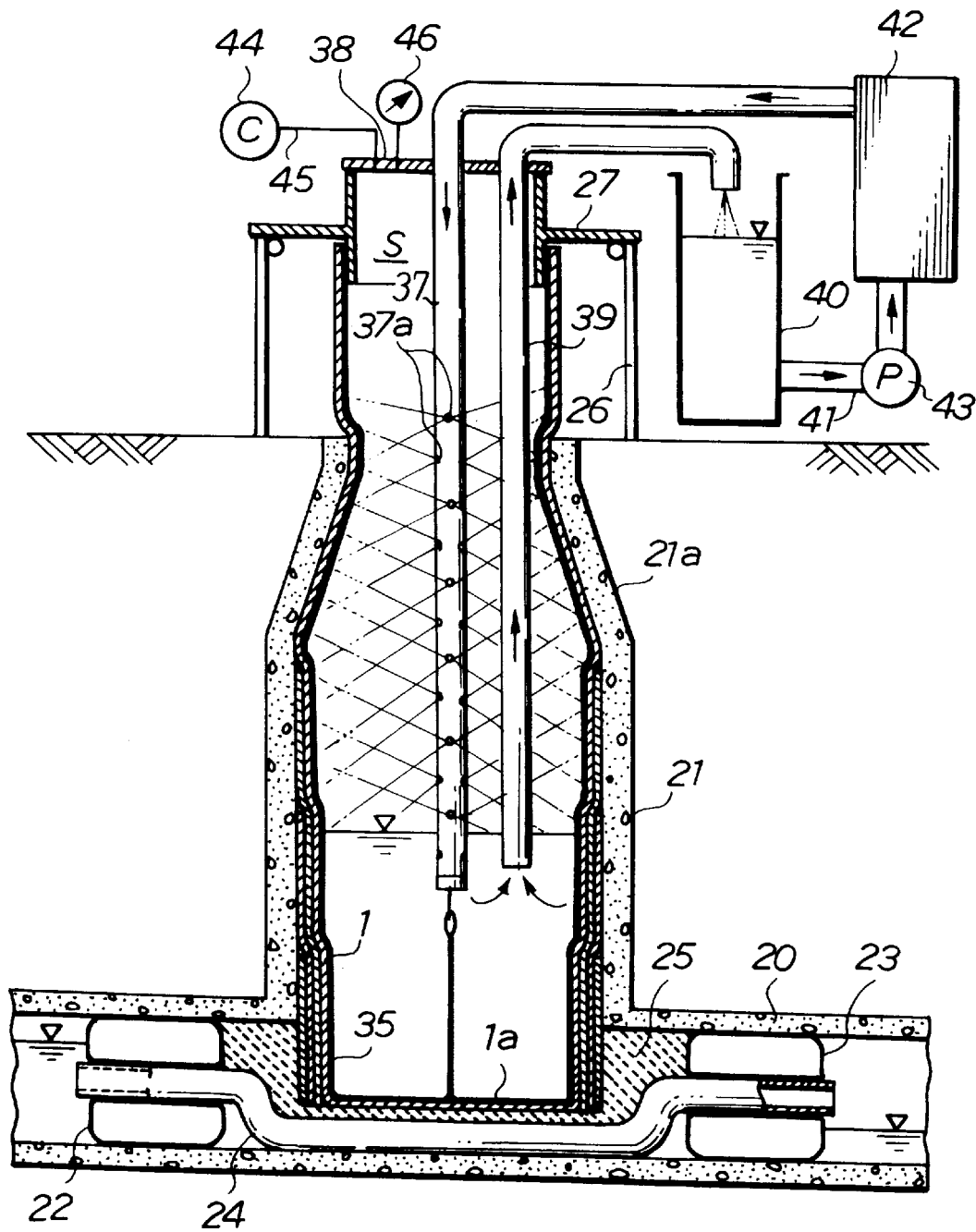
FIG. 16 is a sectional view of the site, illustrating another step of the manhole lining method according to the first embodiment of the invention.

When the insertion of the intra-liner bag 35 along the manhole liner 1 by eversion is completed, a hot water hose 37 attached beforehand to the tail end of the intra-liner bag 35 is drawn into the everted intra-liner bag 35, as shown in FIG. 16. The hot water hose 37 is made with a lot of punctures 37a distributed evenly along that portion of the hose 37 which is disposed inside a closed space S (hereinafter described).

Next, as shown in FIG. 16, a cap 38 is placed over the top opening portion of the adaptor collar 27, and is fastened there to airtightly close the opening of the collar 27, whereupon a closed space S is formed inside the intra-liner bag 35.

Now, the hot water hose 37 and a water outlet hose 39 are drawn deep into the space S to open therein, and that part of the water outlet hose 39 which extends outside the closed space S is led to a hot water tank 40 installed on the ground, and the water outlet hose 39 opens over this tank 40.

A water supply pipe 41 leading out from the lower part of the hot water tank 40 is connected to an inlet port of a boiler 42, and a hot water pump 43 is provided across the water supply pipe 41. To an outlet port of the boiler 42 is connected one end of the hot water hose 37.

An air hose 45 leading out from a compressor 44 is fitted through the cap 38 to open in the closed space S, and a pressure gauge 46 for measuring the inner pressure of the closed space S is provided to communicate with the closed space S across the cap 12.

Thus, as the compressor 44 is driven to supply compressed air to the closed space S via the air hose 44, the intra-liner bag 35 is inflated with the compressed air and presses the manhole liner 1 upon the inner wall of the manhole 21. Incidentally, on this occasion, as the manhole liner 1 is pressed by the compressed air, the uncured liquid thermosetting resin absorbed in the resin-absorbent fabric layer 3 of the liner 1 is caused to ooze out from the lower end of the liner 1 and drops into the filler 25 such as sawdust and rice bran.

Next, while keeping the things as described above, the boiler 42 and the hot water pump 43 are switched on, whereupon the water in the hot water tank 40 is drawn and sent to the boiler 42 by the hot water pump 43, and after the water is heated to a predetermined temperature by the boiler 42, it is supplied to the closed space S by way of the hot water hose 37. Then, the hot water rushing into the hot water hose 37 jets out from the punctures 37a of the hot water hose 37 and reaches the surfaces of the manhole liner 1 to heat the same.

When the hot water has been used to heat the liner 1 it becomes lukewarm and falls and gathers in the bottom of the intra-liner bag 35, and the head of this lukewarm water is pushed down by the internal pressure of the closed space S and, as the result, the water goes up in the water outlet hose 39, and returns to the hot water tank 40; then, the water is again sent to the boiler 42 by the hot water pump 43 and heated and, thereafter, circulated in this system over and over again.

Figure 17:
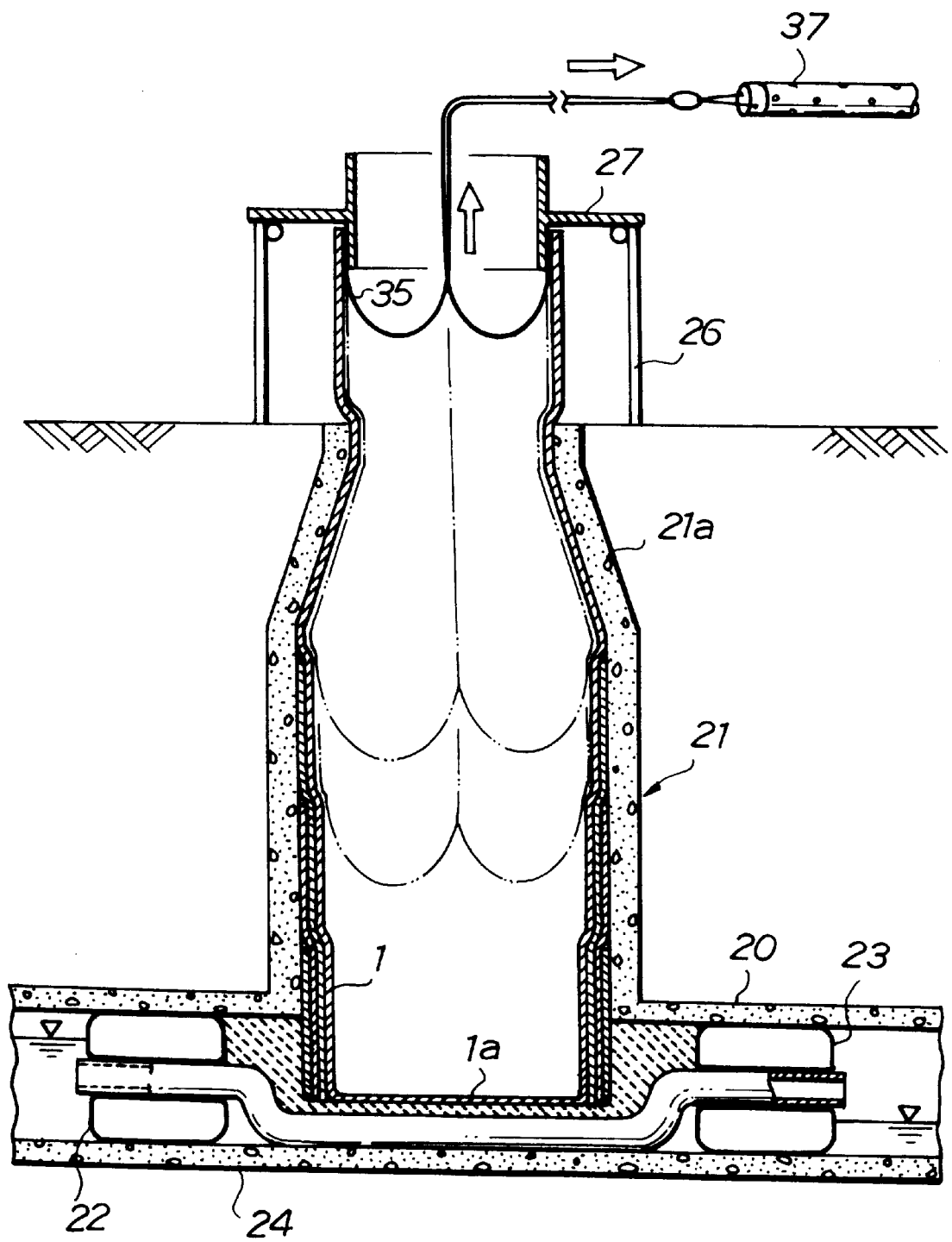
FIG. 17 is a sectional view of the site, illustrating yet another step of the manhole lining method according to the first embodiment of the invention.

As described above, as the hot water is circulated, the hot water jets out from the evenly distributed punctures 37a of the hot water hose 37 and heats the liner 1 to cause the thermosetting resin absorbed in the resin-absorbent fabric layer 3 to be cured evenly and promptly. When the thermosetting resin in the liner 1 is thus hardened, the intra-liner bag 35 together with the stage 26 and the adaptor collar 27 is removed from the manhole liner 1, as shown in FIG. 17. Now, the inner wall and the bottom floor (invert portion) 21b of the manhole 21 are closely lined with the rigid liner 1.

Figure 18:
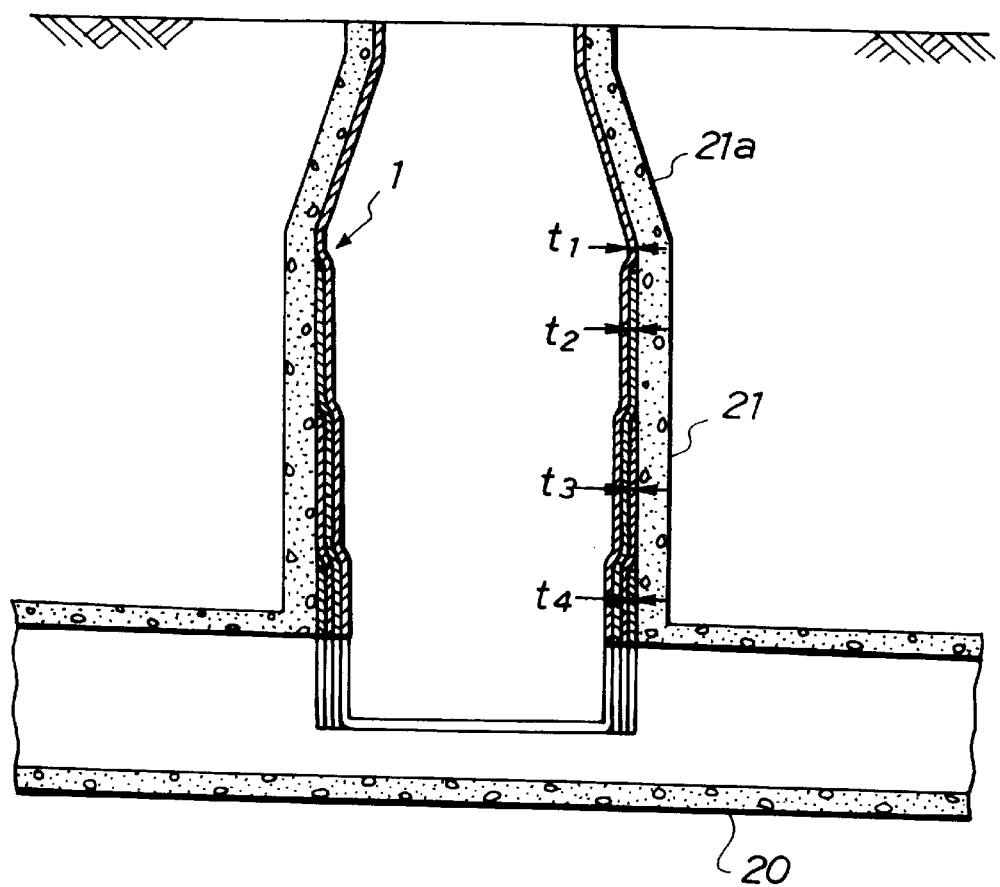
FIG. 18 is a sectional view of the site, illustrating a further step of the manhole lining method according to the first embodiment of the invention.
Figure 19:
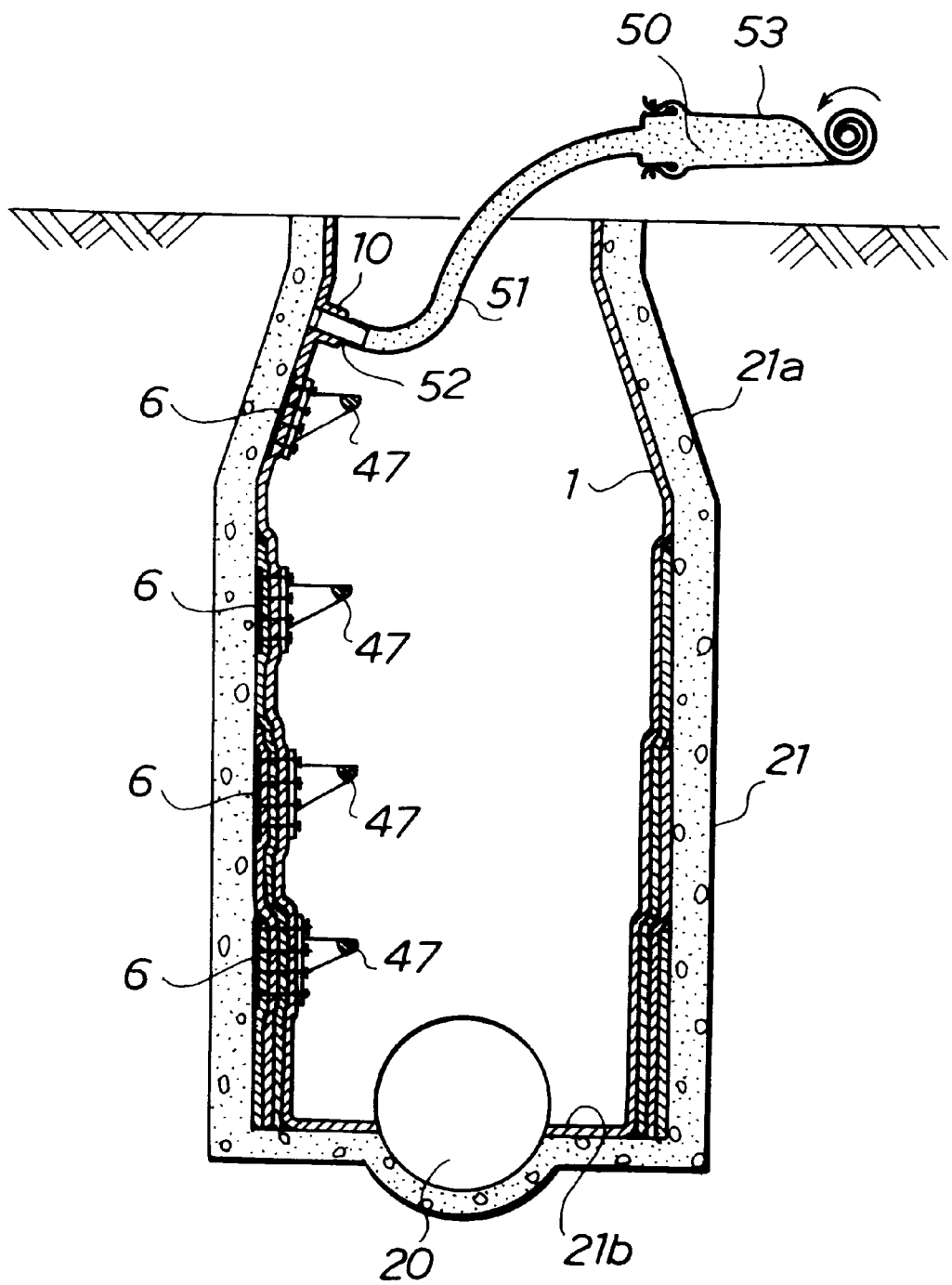
FIG. 19 is a sectional view of the site, illustrating a still further step of the manhole lining method according to the first embodiment of the invention.

Next, as shown in FIGS. 18 and 19, that part of the manhole liner 1 which covers a part of the inner wall of the pipe 20 is cut and removed, and the cut ends are sealed with a putty such as an epoxy resin.

When the inner wall and the bottom floor (invert portion) 21b of the manhole 21 have been thus lined with the manhole liner 1, that portion of the manhole liner 1 which extends outside the manhole is cut off. Then, the rubber plates 29 together with the respective caps 30 (FIG. 20) are removed from the ladder step attachment bases 3-6 to expose the screw end portions of the bolts 7. Thus, as shown in FIG. 23, the screw end portions of the bolts 7 of of the ladder step attachment bases 3-6 protrude from the inner wall face of the manhole liner 1, and then, as shown in FIGS. 24 and 25, the ladder footsteps 47 are attached by means of the bolts 7.

Specifically, each ladder step 47 is provided with a pair of triangular support plates and each support plate is formed with an attachment plate 48 having eight holes suitable to receive the bolts 7. Thus, each ladder step 47 is attached to the inner wall of the manhole liner 1, as the attachment plates 48 are laid on the plates 28 with the bolts 7 engaging in the respective holes of the plates 48 and finally nuts 49 are put on the screw end portions of the bolts 7 and tightly fastened against the plates 28. Thus, the steps 47 are fixed to the ladder step attachment bases 3-6, and thereby fastened on the liner 1.

As described above, unlike the conventional practices, the steps 47 are not attached directly to the inner wall of the manhole 21, but they are attached to the liner 1 by means of the pre-installed ladder step attachment bases 3-6, and the liner 1 is locally made thicker where the steps 47 are attached by providing the ladder step attachment bases 3-6, so that even if the manhole 21 is too aged to support the steps 47 by itself, the steps 47 are reliably supported by the liner 1; furthermore, each ladder step 47 is so steadily supported by the entire structure of the liner 1 that even when a step 47 is loaded with a human weight it can withstand the weight without tottering. Also, by virtue of the pre-installed bolts 7 extending beyond the inner face of the liner 1, the ladder steps 47 can be easily attached to the liner 1, and it is now unnecessary to make holes into the inner face of the hardened liner 1 for attachment of the ladder steps. Hence, the human labor is much reduced and the operation time is substantially shortened.

As explained earlier, when the liner bag 1 is hardened inside the manhole 21 it becomes very hot and as it cools down its size is reduced with a result that a gap is created between the manhole 21 and the liner 1. In order to close this gap, it is necessary to fill the gap with a curable liquid filler 50. In the present embodiment of the invention, injection of the filler 50 into the gap is effected with the use of the injection hose attachment bases 9 in the following manner.

As shown in FIGS. 19 and 26, in each of the two injection hose attachment bases 9, the cap 34 (ref. FIGS. 21 and 22) is unscrewed from the injection port 10 of the injection hose attachment base 9; and a filler injection hose 51 is connected to the injection port 10 by screwing a tapped plug 52 provided at the free end of the filler injection hose 51 into the injection port 10. Then, the filler 50 contained in a tube 53 (ref. FIG. 19) is forced out by rolling up the tail end portion of the tube 53c whereupon the filler 50 enters the gap between the manhole 21 and the liner 1 after passing through the filler injection hose 51 and the injection port 10 of the injection hose attachment base 9. Thus, the gap is filled with the filler 50, and upon curing of the filler 50, the liner 1 is closely joined to the manhole wall. Incidentally, the filler 50 can be a curable fluid material such as cement, mortar, synthetic resin (e.g., polyester, vinyl ester, epoxy, urethane), and resin mortar.

Thus, according to the above-described embodiment of the manhole lining operation, it is possible to inject the filler 50 into the gap between the manhole 21 and the liner 1 by means of the pre-installed injection port 10 of the injection hose attachment base 9 after connecting the filler injection hose 51 to the injection port 10, so that it is now unnecessary to make holes into the inner face of the hardened liner 1 for injection of the filler 50. Hence, the human labor is much reduced and the operation cost is substantially lowered.

Incidentally, the pressure that works upon the outer walls of the manhole 21, imposed by the underground water etc., increases with depth, so that it is considered rational and safer to design the thickness of the manhole to become greater with depth. Thus, in the present embodiment of the invention, the liner 1, which is applied to the inner wall of the aged manhole 21 for rehabilitation, is designed in a manner such that its thickness increases stepwise as the depth increases. More specifically, in order to make the manhole 21 stronger at its lower portions, the thicknesses t1, t2, t3, and t4 are designed to increase in this order, i.e., t1<t2<t3<t4, as shown in FIG. 18.

Also, in the case of a conventional method wherein a bottomless tubular manhole liner was employed; when the insertion of the intra-liner bag (35) inside the manhole liner is completed and the intra-liner bag is inflated with the compressed air to press the manhole liner upon the inner wall of the manhole, the vertical component of the pressure of the compressed air working normally upon the reducer portion (21a) of the manhole tended to cause the liner to sip upward. However, in this embodiment of the invention, not only the peripheral wall but also the bottom floor 21b of the manhole 21 is lined with the liner 1 so that the pressure of the compressed air prevailing in the closed space S also works downward upon the bottom 1a of the manhole liner 1 to urge the liner bag 1 downward, and, thus, the the liner layer 1 is prevented from slipping upward. Hence, it is possible to conduct the lining operation with efficiency.

Furthermore, in the present invention, the manhole liner bag 1 and the intra-liner bag 35 are separate entities and are separable from each other so that the reducer fitting of the liner 1 is done relatively easily, and thus the manufacture of the liner 1 is simplified. Owing to the fact that the intra-liner bag 35, which is everted into the liner 1 after the latter is received in the manhole 21, has a diameter greater than the minimum diameter of the liner 1 at the upper end of the reducer portion, the intra-liner bag 35 is easily creased at the time of its eversion; however, this is not at all a problem, for the intra-liner bag 35 is removed from the liner 1 eventually and does not constitute a part of the liner 1.

When the above-described lining operation is completed, the water stop plugs 22, 23 and the hose 24 are removed from the pipe 20, and then the filler 25 remaining in the pipe 20 is carried downstream in the pipe 20 by the drain water, so that the thermosetting resin that has dropped into the filler 25 during the lining operation is also brought away in the filler 25. Consequently, the thermosetting resin 4 that has dropped in the pipe 20 does not remain in the pipe 20, and the work of removing the hardened resin 4 is now unnecessary.

Also, according to the method of the present invention, the thermosetting liquid resin 4 absorbed in the liner 1 is effectively heated by the hot water uniformly ejected from the punctuated hot water hose 37 so that the thermosetting resin 4 is promptly cured uniformly with a minimum amount of heat energy. Therefore, it is possible to make more compact the heating and circulation devices such as boiler 42 and hot water pump 43.

Also, according to the method of the invention, even during the lining operation, the drain water is allowed to flow in the pipe 20 past the manhole 21 by virtue of the hose 24, so that it is no longer necessary to pump out the drain water from the pipe 20 at a location which is upstream to the manhole 21 and discharge it at some other place. Hence, the operation is significantly rationalized.

Incidentally, in the above example, although hot water showering is used as the method for thermally curing the thermosetting resin, it is equally effective to employ other heating methods such as filling the intra-liner bag 35 with hot water, circulating hot water, and using steam. Also, it is possible that the thermosetting resin may be replaced by another curable liquid resin such as photosetting resin.

Embodiment 2

Figure 27:
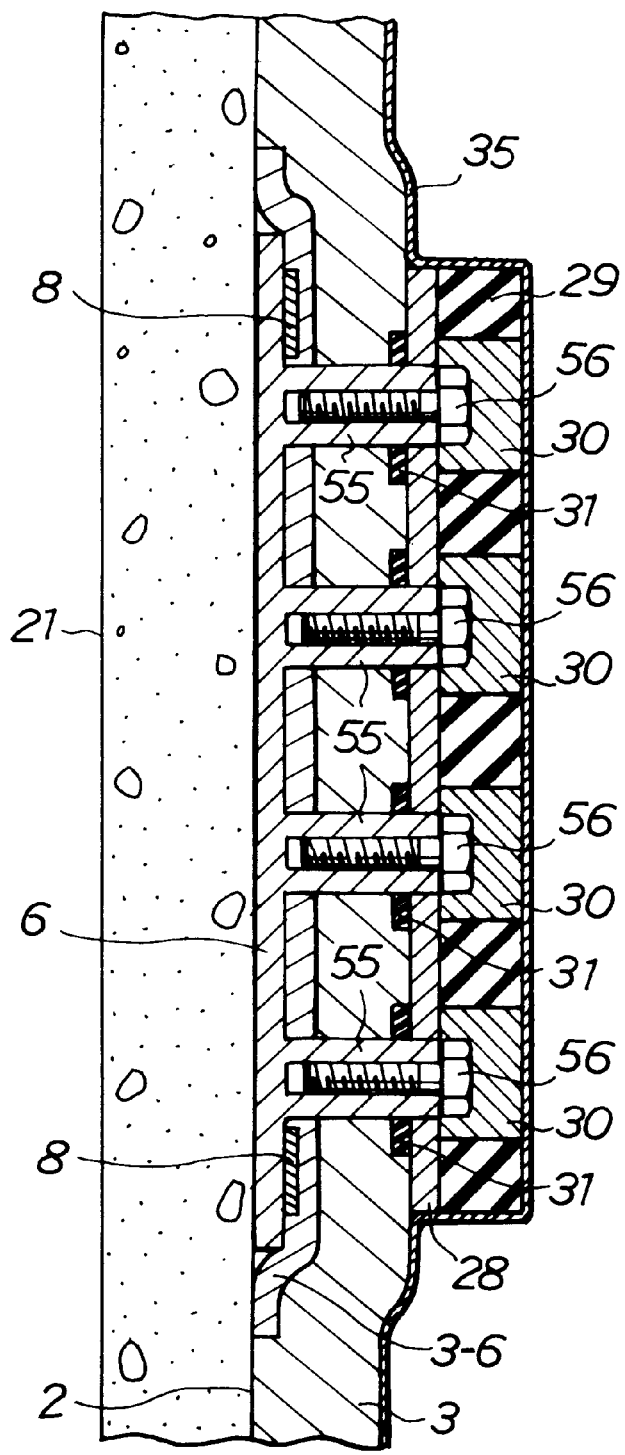
FIG. 27 is a sectional view of a ladder step attachment base, illustrating how it is disposed during the lining operation according to the second embodiment of the invention.
Figure 28:
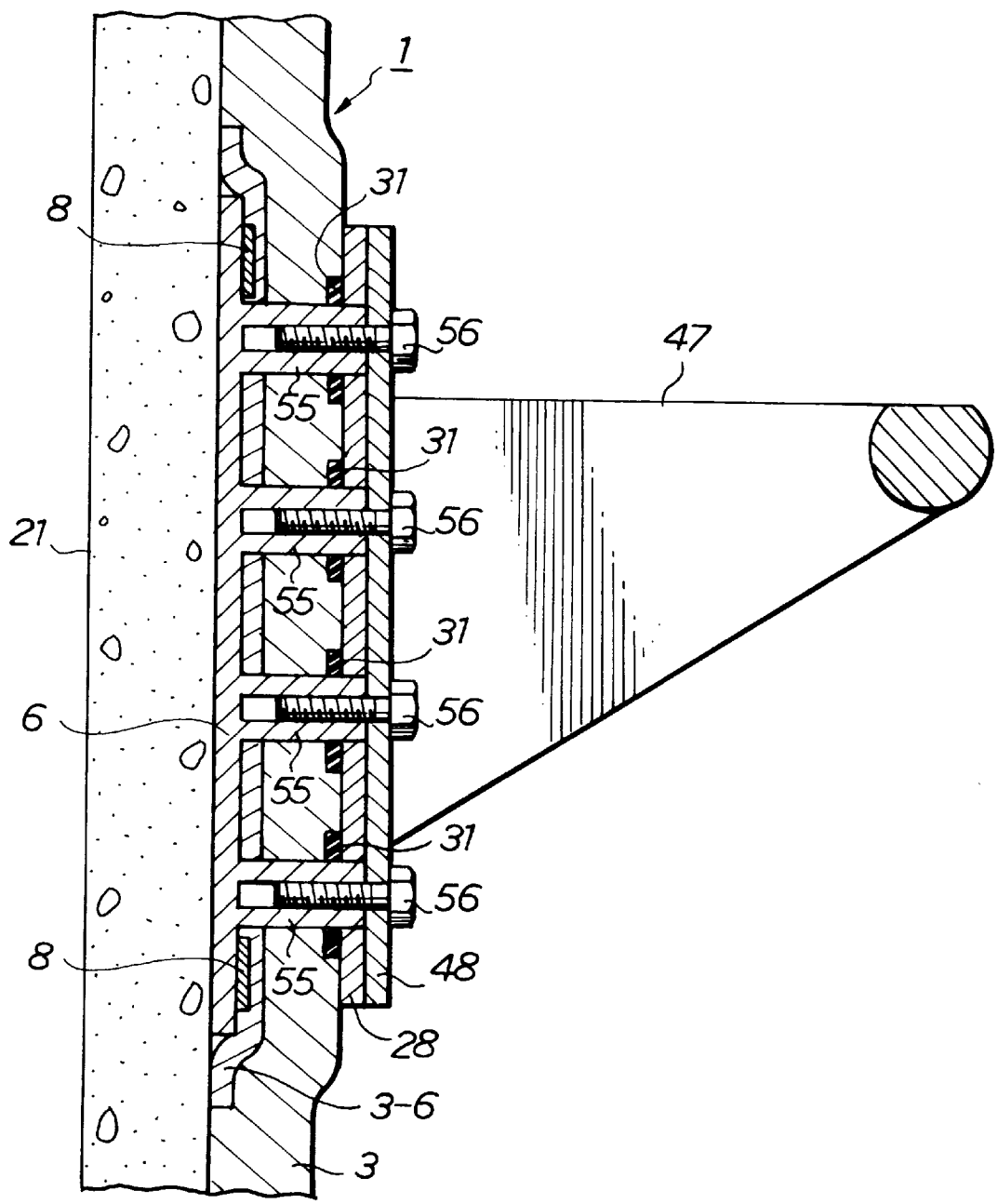
FIG. 28 is a sectional view of a ladder step, illustrating how it is attached in the second embodiment of the invention.

Next, a second embodiment of the present invention will be described with reference to FIG. 27 and FIG. 28. FIG. 27 is a sectional view of a ladder step attachment base during the lining operation, FIG. 28 is a sectional view of a ladder step after it is attached to the attachment base. In these two figures the elements that have counterparts in FIGS. 20 and 24 are designated with the same reference numerals as are given to their counterparts.

In this second embodiment, as shown in FIG. 27, each narrow vertical plate 6 is integrally formed with eight sleeve nuts 55, whose hollow ends are made to penetrate through the resin-absorbent fabric layer 3 and extend slightly from the inner wall thereof. During the lining operation, however, that portion of each sleeve nut 55 which extends from the inner wall of the resin-absorbent fabric layer 3 is passed through a stopper 31 and a plate 28, which are made of either a metal (such as stainless steel) or a synthetic resin, in a manner such that the hollow ends of the sleeve nuts 55 become flush with the inner side face of the plate 28. Bolts 56 are screwed tightly in the respective sleeve nuts 55 to thereby press the plate 28 against the fabric layer 3. Thus, the fabric layer 3 is held firmly between the plates 28 and the plates 6. Quite similarly as in the first embodiment, prior to the lining operation, the head of each bolt 56 is received in a cap 30, which is supported by a rubber plate 29.

When the inner wall and the bottom floor of the manhole 21 have been lined with the manhole liner 1 in the same manner as in the first embodiment, the intra-liner bag 35 is removed from the manhole liner 1, and then, the rubber plates 29 together with the respective caps 30 are removed from the ladder step attachment bases 3-6. Then, all of the bolts 56 are unscrewed from the respective sleeve nuts 55, and after the attachment plates 48 of a step 47 are laid on the plates 28, the bolts 56 are again screwed into the sleeve nuts 55 from over the respective plates 48, as shown in FIG. 28, and as the bolts 56 are tightly fastened, the steps 47 are fixed to the ladder step attachment bases 3-6, and thereby attached to the liner 1.

More specifically, each ladder step 47 is provided with a pair of triangular support plates and each support plate is formed with an attachment plate 48 having eight holes which respectively meet the holes of the sleeve nuts 55. Thus, each ladder step 47 is attached to the inner wall of the manhole liner 1, as the attachment plates 48 are laid on the plates 28 and the bolts 56 are tightly screwed into the sleeve nuts 55 from over the plate 48.

Therefore, in this embodiment also, unlike the conventional practices, the steps 47 are not attached directly to the inner wall of the manhole 21, but they are attached to the liner 1 by means of the pre-installed ladder step attachment bases 3-6, and the liner 1 is locally made thicker where the steps 47 are attached by providing the ladder step attachment bases 3-6, so that even if the manhole 21 is too aged to support the steps 47 by itself, the steps 47 are reliably supported by the liner 1; furthermore, each ladder step 47 is so steadily supported by the entire structure of the liner 1 that even when a step 47 is loaded with a human weight it can withstand the weight without tottering.

Also, by virtue of the pre-installed sleeve nuts 55 extending beyond the inner face of the liner 1, the ladder steps 47 can be easily attached to the liner 1, and it is now unnecessary to make holes into the inner face of the hardened liner 1 for attachment of the ladder steps. Hence, the human labor is much reduced and the operation time is substantially shortened.

Embodiment 3

Figure 29:
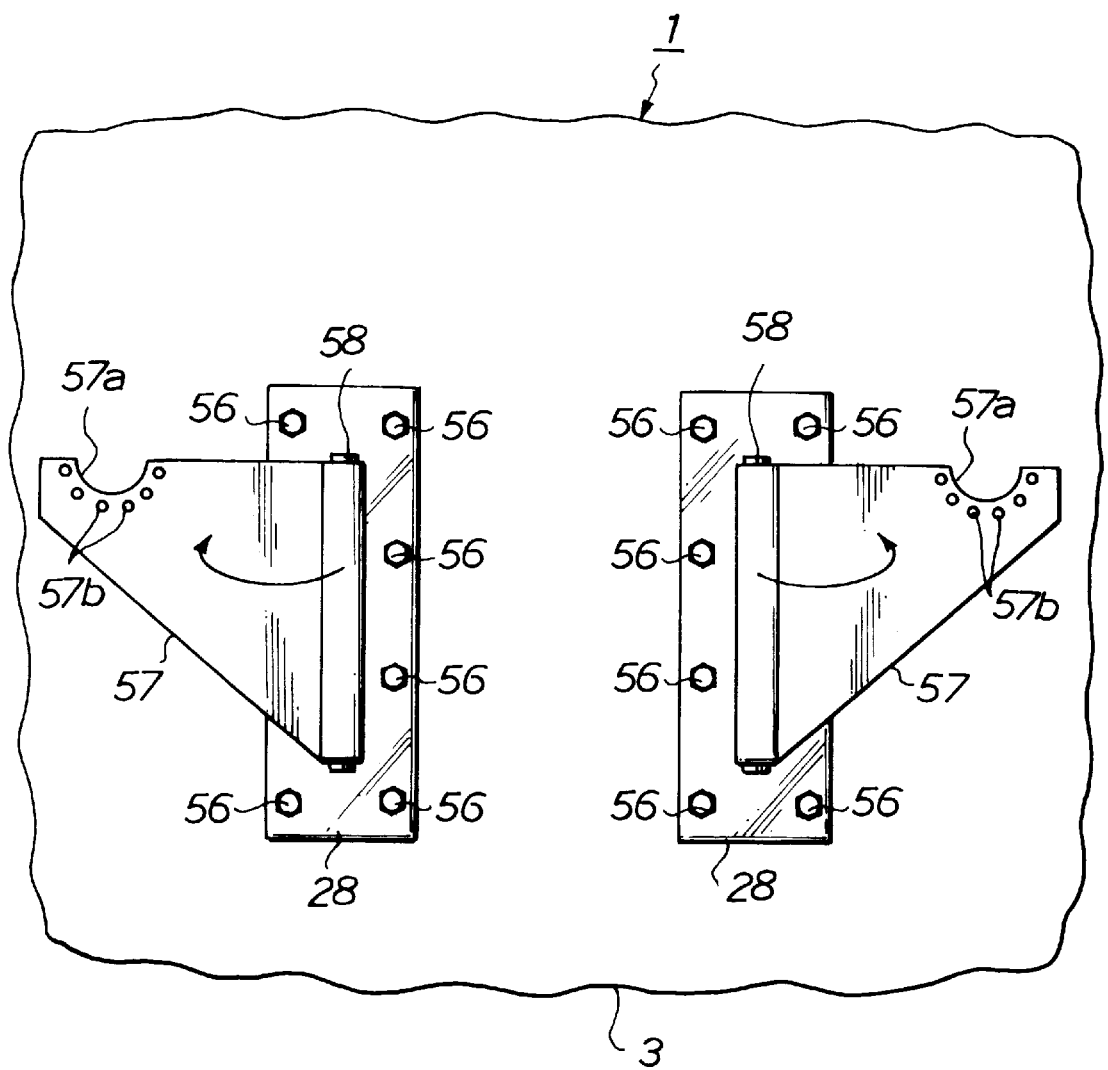
FIG. 29 is a view of a part of a manhole liner of a third embodiment of the invention, as viewed from inside.
Figure 30:
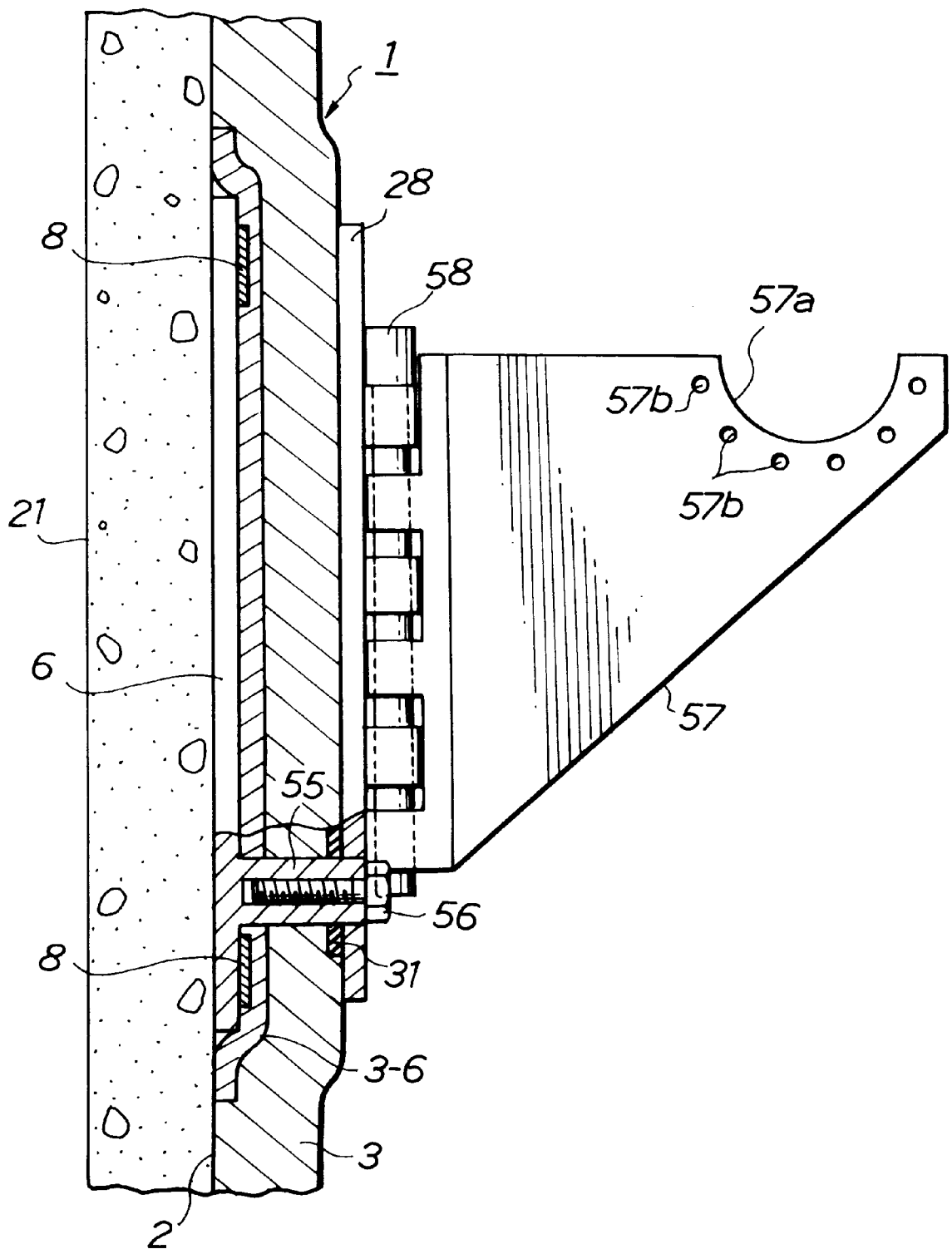
FIG. 30 is a sectional view of a ladder step attachment base, illustrating how it is disposed during the lining operation according to the third embodiment of the invention.
Figure 31:
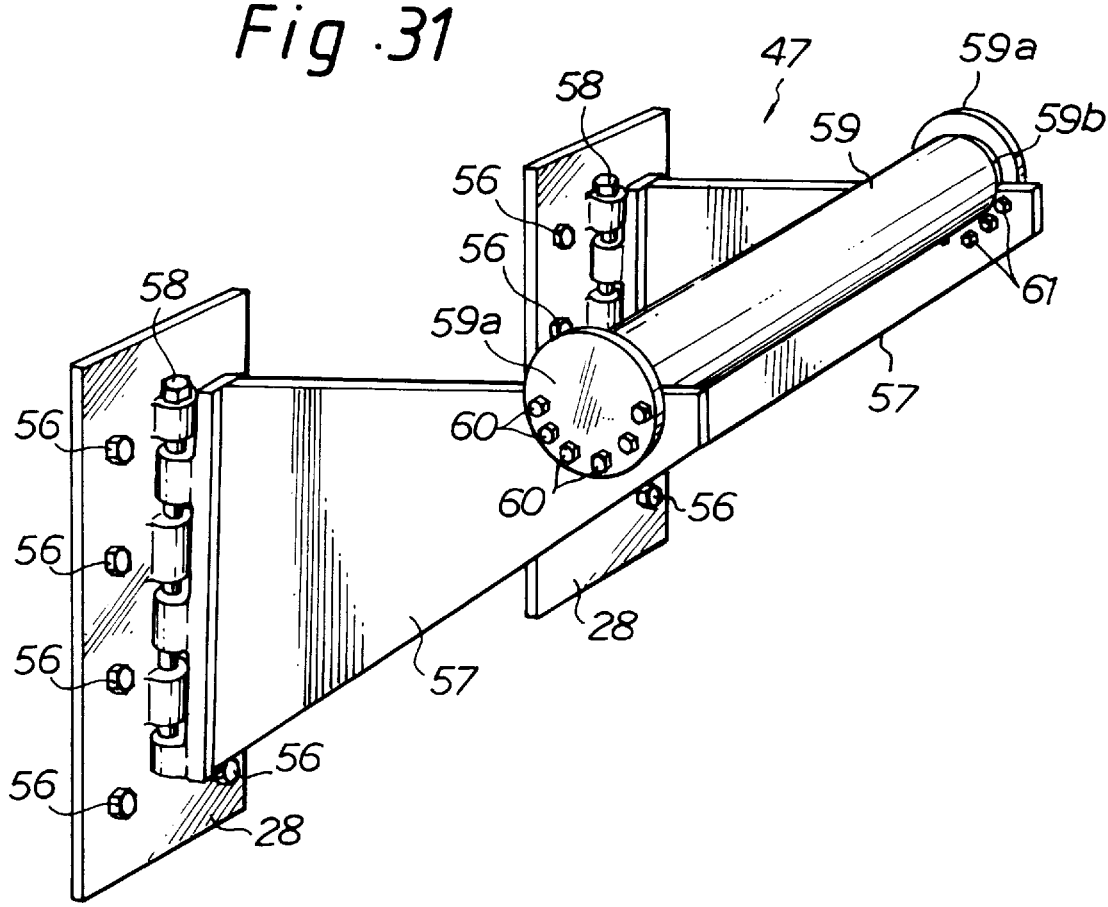
FIG. 31 is a perspective view of a ladder step, illustrating how it is constructed in the third embodiment of the invention.
Figure 32:
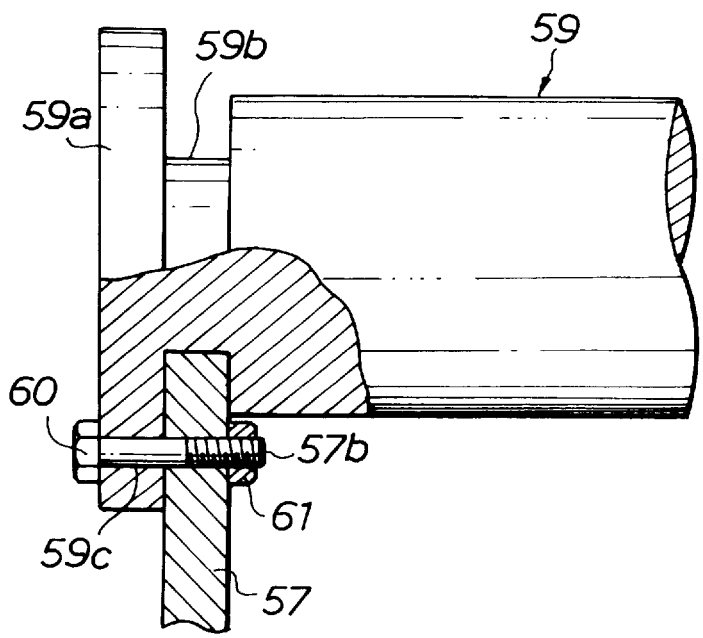
FIG. 32 is an enlarged partially cut away view of the ladder step of the third embodiment of the invention, illustrating the construction of a bar attachment portion of the ladder step.
Figure 33:
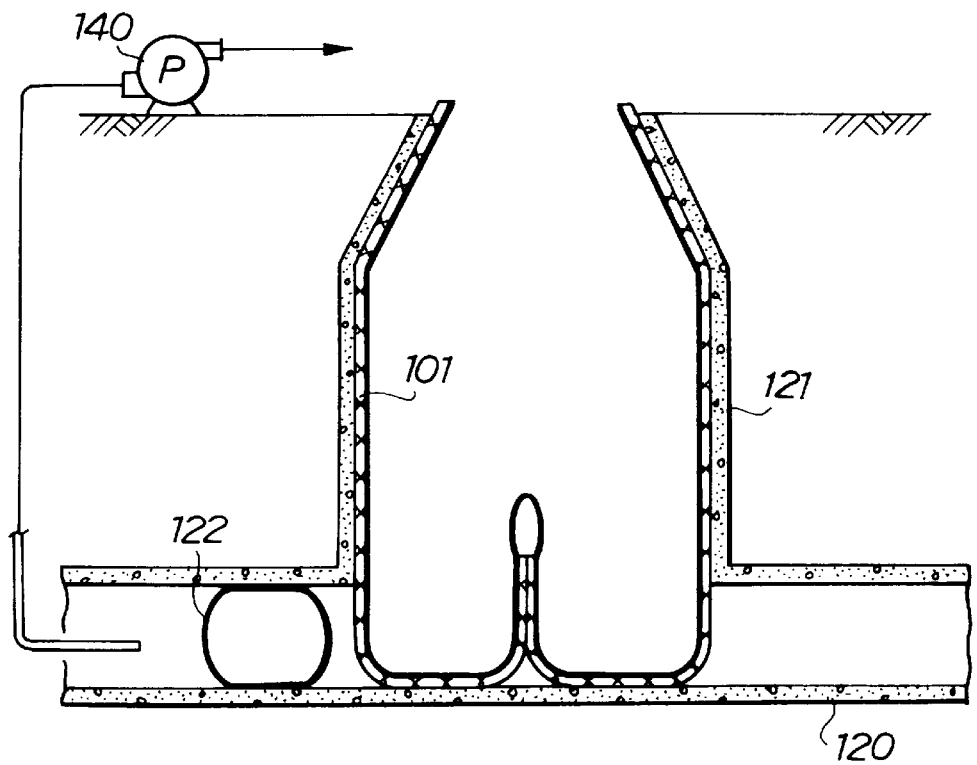
FIG. 33 is a sectional view of a repair site, illustrating a conventional method for lining a manhole.
Figure 34:
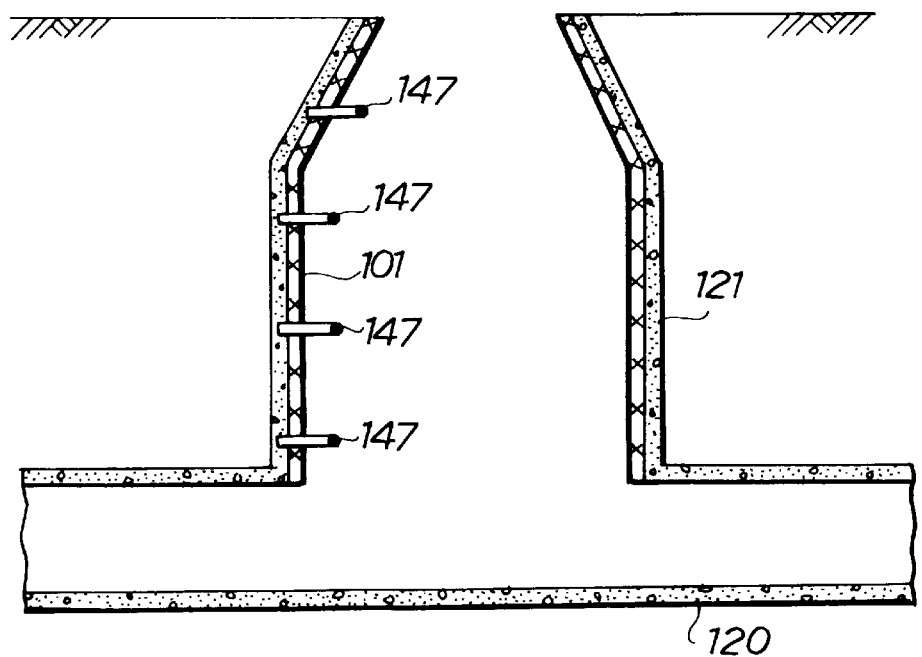
FIG. 34 is a sectional view of the repair site, illustrating the conventional method for lining the manhole.

Next, a third embodiment of the present invention will be described with reference to FIGS. 29 through 32. FIG. 29 is a view of a part of a manhole liner of this embodiment, as viewed from inside; FIG. 30 is a sectional view of a ladder step attachment base, illustrating how it is disposed during the lining operation; FIG. 31 is a perspective view of a ladder step, illustrating how it is provided; and FIG. 32 is an enlarged partially cut away view of the ladder step, illustrating the construction of a bar attachment portion of the ladder step.

In this third embodiment, as shown in FIG. 29, corresponding to each step of the ladder, a pair of plates 28 are attached to the inner wall of the fabric layer 3 of the manhole liner 1 in exactly the same manner as the plates 28 of Embodiment 2 are fastened on the fabric layer 3 (ref. FIG.

27). More specifically, as shown in FIG. 30, each narrow vertical plate 6 is integrally formed with eight sleeve nuts 55, whose ends are made to penetrate through the resin-absorbent fabric layer 3 and extend slightly from the inner wall thereof. During the lining operation, that portion of each sleeve nut 55 which extends from the inner wall of the resin-absorbent fabric layer 3 is passed through a stopper 31 and a plate 28 in a manner such that the ends of the sleeve nuts 55 become flush with the inside face of the plate 28. Bolts 56 are screwed in the respective sleeve nuts 55. Thus, the fabric layer 3 is held between the plates 28 and the plates 6. Incidentally, in FIG. 30, the reference numeral 8 designates a pair of narrow horizontal plates to interconnect each pair of the vertical plates 6.

To each plate 28 is connected a triangular support plate 57, which will eventually constitute a part of a ladder step 47, as shown in FIG. 31. This connection is effected via a hinge 58, so that each support plate 57 is pivotal. Thus, when the manhole liner 1 is inserted into the manhole 21, each pair of the support plates 57 are pivoted in a manner such that the plates 57 are swung away from each other and laid flat over the inner wall of the resin-absorbent fabric layer 3, as shown in FIG. 29.

As shown in detail in FIG. 30, each support plate 57 is roughly in the shape of a right-angled triangle, and the horizontal side of the triangle is broken by a semicircular recess 57a, which is formed to provide the support plate 57 with a bar bearing recess. Six small bolt holes 57b are made through the support plate 57 in the vicinity of the periphery of the semicircular recess 57a.

When the inner wall and the bottom floor of the manhole 21 have been lined with the manhole liner 1 in the same manner as in the first embodiment, the intra-liner bag is removed from the manhole liner 1, and then, each support plate 57 is raised until the support plate 57 stands normal to the surface of the fabric layer 3, as shown in FIG. 30. Next, as shown in FIG. 31, a cylindrical bar 59 is mounted on each pair of the support plates 57 to complete a ladder step 47.

More specifically, as shown in detail in FIG. 32, each end of the bar 59 is formed with a flange 59a and an annular groove 59b, which latter is formed immediately interior to the flange 59a. The flange 59a is formed with six bolt holes which correspond the six bolt holes of the support plate 57. The length of the bar 59 is only slightly greater than the distance between the two support plates 57, so that the distance between the grooves 59b is equal to the distance between the support plates 57. The width of the groove 59b is barely greater than the thickness of the support plate 57. Thus, the bar 59 engages with the support plates 57 as the bar 59 is placed in the recesses 57b, and the edges of the recesses 57b in the respective grooves 59b of the bar 59. After turning the bar 59 until the bolt holes 59c of the flange 59a meet the bolt holes 57c of the support plates 57, bolts 60 are passed through the bolt holes 59c and 57c and are fastened with the nuts 61, respectively. Thus, the bar is fixed on the support plates 57.

Therefore, in this embodiment also, unlike the conventional practices, the steps 47 are not attached directly to the inner wall of the manhole 21, but they are attached to the liner 1 by means of the pre-installed ladder step attachment bases 3-6, and the liner 1 is locally made thicker where the steps 47 are attached by providing the ladder step attachment bases 3-6 (ref. FIG. 30), so that even if the manhole 21 is too aged to support the steps 47 by itself, the steps 47 are reliably supported by the liner 1; furthermore, each ladder step 47 is so steadily supported by the entire structure of the liner 1 that even when a step 47 is loaded with a human weight it can withstand the weight without tottering. Furthermore, all the other effects attained in the Embodiments 1 and 2 are also attained in this Embodiment 3.

While the invention has been described in its preferred embodiments, it is to be understood that modifications will occur to those skilled in the art without departing from the spirit of the invention. The scope of the invention is therefore to be determined solely by the appended claims.

What is claimed is:

1. A tubular liner with which an inner wall of a manhole is lined, comprising a fabric layer soaked with a curable liquid resin, and at least one connector means connected to an inner wall of the tubular liner capable of rigidly receiving connective ends, said connector means consisting of a plurality of first assemblies to which ladder steps are connected.

2. The tubular liner as recited in claim 1, further comprising a bottom so that the liner is closed and flat at its lower end.

3. The tubular liner as recited in claim 2, further consisting of an airtight film layer which covers up an outer wall of said fabric layer.

4. The tubular liner as recited in claim 1 wherein each one of said first assemblies includes bolts, which are supported by said fabric layer and partially extend beyond an inner wall of said fabric layer.

5. The tubular liner as recited in claim 4, wherein each one of said first assemblies further includes first plates which are laid over an outer wall of said fabric layer and with which the heads of said bolts are integrally formed, and second plates which are laid over the inner wall of said fabric layer, threaded end portions of said bolts penetrating partially beyond said second plates.

6. The tubular liner as recited in claim 1, wherein each one of said first assemblies includes sleeve nuts, which are supported by said fabric layer and the hollow ends of which are exposed from said fabric layer.

7. The tubular liner as recited in claim 6, wherein each one of said first assemblies further includes first plates which are laid over an outer wall of said fabric layer and with which the closed ends of said sleeve nuts are integrally formed, and second plates which are laid over an inner wall of said fabric layer, the hollow ends of said sleeve nuts penetrating and being flush with an exposed inner faces of said second plates.

8. The tubular liner as recited in claim 1, wherein said connector means further comprises a plurality of second assemblies to which liquid filler injection hoses are connected.

9. The tubular liner as recited in claim 8, wherein each one of said second assemblies includes bolts, which are supported by said fabric layer and partially extend beyond an inner wall of said fabric layer, and a tubular means penetrating through the fabric layer thereby being capable of communicating a gap between the inner wall of the manhole and outer wall of an fabric layer with the liquid filler injection hose.

10. The tubular liner as recited in claim 1 wherein a thickness of said fabric layer incrementally increases in a stepped manner from an upper end to a lower end of said tubular liner such that the lower end is thicker than the upper end.

11. The tubular liner as recited in claim 1, wherein the thickness of said fabric layer is increased locally where said connector means are provided.

12. The manhole liner as recited in claim 1, wherein said fabric layer is reinforced by ribbons of glass cloth.

13. A method for lining a manhole which communicates with a bottom of a pipe, comprising the steps of: (a) inserting into the manhole a tubular liner consisting of a fabric layer soaked with a curable liquid resin and at least one connector means connected to the inner wall of the tubular liner capable of rigidly receiving connective ends; (b) inserting an inflatable air bag inside the tubular liner, the bag having an open end; (c) closing the open end of the air bag thereby forming a closed space inside the air bag; (d) supplying pressurized fluid to said closed space to thereby cause said air bag to inflate and press said manhole liner against the inner wall of the manhole; (e) curing said liquid resin to thereby harden said manhole liner; (f) removing the air bag from the manhole; and (g) rigidly connecting connective ends of a set of ladder steps to said connector means.

14. The method as recited in claim 13, further comprising a step (h) of rigidly connecting connective ends of at least one liquid filler injection hose to said connective means.

15. The method as recited in claim 14, further comprising, after step (h), a step of injecting a liquid filler into a gap between the inner wall of the manhole and the outer wall of the fabric layer by way of said connector means and said at least one liquid filler injection hose, and a further step of removing said at least one liquid filler injection hose.

* * * * *